United States Patent
Igein

(10) Patent No.: US 11,335,149 B2
(45) Date of Patent: May 17, 2022

(54) LOCKER PORT SYSTEM FOR GPS TRACKED PORTABLE SECUREMENT DEVICES

(71) Applicant: Austin Igein, Atlanta, GA (US)

(72) Inventor: Austin Igein, Atlanta, GA (US)

(*) Notice: Subject to any disclaimer, the term of this patent is extended or adjusted under 35 U.S.C. 154(b) by 0 days.

(21) Appl. No.: 17/208,489

(22) Filed: Mar. 22, 2021

(65) Prior Publication Data

US 2021/0279986 A1 Sep. 9, 2021

Related U.S. Application Data

(63) Continuation-in-part of application No. 16/810,808, filed on Mar. 5, 2020.

(51) Int. Cl.
| | |
|---|---|
| *G07C 9/00* | (2020.01) |
| *H04W 4/029* | (2018.01) |
| *G06K 7/14* | (2006.01) |
| *H04W 12/50* | (2021.01) |
| *G06K 7/10* | (2006.01) |
| *H04W 4/80* | (2018.01) |

(52) U.S. Cl.
CPC ..... *G07C 9/00912* (2013.01); *G06K 7/10386* (2013.01); *G06K 7/1417* (2013.01); *G07C 9/0069* (2013.01); *H04W 4/029* (2018.02); *H04W 4/80* (2018.02); *H04W 12/50* (2021.01)

(58) Field of Classification Search
CPC ........ G07C 9/00912; G07C 9/27; G07C 9/23; B65D 55/02; G06K 7/10722; G06K 7/1417; H04W 76/14
See application file for complete search history.

(56) References Cited

U.S. PATENT DOCUMENTS

| | | | | |
|---|---|---|---|---|
| 9,848,457 | B1 * | 12/2017 | Yae | H04W 76/14 |
| 10,049,519 | B2 * | 8/2018 | Wilkinson | G07C 9/00896 |
| 10,902,375 | B2 * | 1/2021 | Wilkinson | G06Q 10/0833 |
| 2014/0316918 | A1 * | 10/2014 | Zaniker | G07F 17/12 |
| | | | | 705/21 |
| 2015/0356664 | A1 * | 12/2015 | Mackler | G06Q 30/0635 |
| | | | | 705/26.81 |
| 2020/0051015 | A1 * | 2/2020 | Davis | G06K 19/0723 |

* cited by examiner

*Primary Examiner* — Thomas D Alunkal
(74) *Attorney, Agent, or Firm* — Smith Tempel Blaha LLC; Gregory Scott Smith

(57) ABSTRACT

A locker bank and kiosk system that provide storage for multi-featured portable locker boxes, wherein each portable locker box includes a global position system receiver for location monitoring as well as other features. Using an app that is running on a mobile device or the kiosk, the user can identify an available or vacant locker, reserve the locker, open the locker and retrieve the portable locker box and store other items within the locker in the locker bank.

8 Claims, 19 Drawing Sheets

LOCKER PORT SYSTEM FOR GPS TRACKED PORTABLE SECUREMENT DEVICES

BACKGROUND

Just imagine that you have returned to your lounge chair and shade umbrella after meandering down the beach with your kids collecting sea shells. You notice your spouse is not yet back from the bar with the drinks so you sit down to check your texts for a moment. You reach into the bag, but no phone. You dig deeper and then reach for your pocket and realize that your phone and your wallet are missing. You think that surely your spouse has them, so you sit back and wait. As your spouse finally approaches with arms full of beverages and a look of angst on her face, you are greeted with "why the heck did not you answer your phone, I needed help carrying all this and I called you several times". At this point your little trip to the beach begins to unravel in front of you as you slowly realize that your spouse did not have your phone or your wallet, and now you are frantically searching for what else may be missing and asking others around you if they saw anyone steal your belongings.

Similar scenes like this happen all over the world—on beaches, in parks, at sporting events, concerts, theme parks, etc. Many such locations have publicly available or pay-per use locker box banks that a person can use or rent to keep their items safe. However, generally these locker box banks are not conveniently located to where the person will be (i.e. lounging in a chair on the beach) and so, the user has to trudge back and forth between the locker box bank and his or her current location to retrieve items (i.e. to look at his or her phone to check for messages, grab an ID and cash to purchase a drink, etc.). Further, thieves know where the locker box banks are located, and it makes them more of a target. There is a need in the art for a lock box or safe that is portable, self-service and publicly accessible.

BRIEF SUMMARY

An embodiment of the present invention is directed towards a locker system that includes a plurality of ports for housing a plurality of multi-featured lock boxes. Each of the multi-featured lock boxes include a global position system receiver for location monitoring as well as other features. Using an app that is running on a mobile device, a user can register and select an access PIN, search for vacant lock boxes, navigate to or locate a vacant lock box and enable use of the lock box by pairing the user's mobile device with the lock box. Once paired and enabled, the app is synchronized with the paired lock box and the user selected PIN is loaded into the lock box to be used for opening (and in some embodiments locking) the lock box. The user can enter the PIN to open the lock box, place items within the lock box, then close and lock the lock box. When the user is done with the lock box, the user can open the lock box by entering the PIN, remove his or her belongings, close the lock box and unpair using the user's mobile device. The lock boxes may be dispersed, such as sitting at their last used location or they may be stored in a locker bank. For locker stored lock boxes, the user can approach a locker bank that houses one more lock boxes or the user can utilize the app to find a locker bank. The user can utilize the app to register with a vacant locker stored lock box or the user can approach a kiosk to register with a vacant lock box. Once registered, the locker door housing the lock box may automatically open or, the user can enter the PIN after approaching the locker bank to open the locker door. Further, the locker bank may identify that the user is proximate to the locker by detecting the user's phone, using facial recognition or the like, and then automatically open the locker door or provide some indicia to identify the locker. The user can then remove the lock box and utilize it as described above, as well as store other items within the locker. Other aspects and features of the lock box and the system using the lock box are described in further detail in the following description and figures.

DETAILED DESCRIPTION OF THE VARIOUS EMBODIMENTS

The present invention, as well as features and aspects thereof, is directed towards providing a mobile lock box or safe, and more particularly, a weather tolerant totable lock box that be made publicly accessible to consumers at a variety of locations or venues, such as the beach, concerts, sporting events and parks as a few non-limiting examples.

Figure 1:
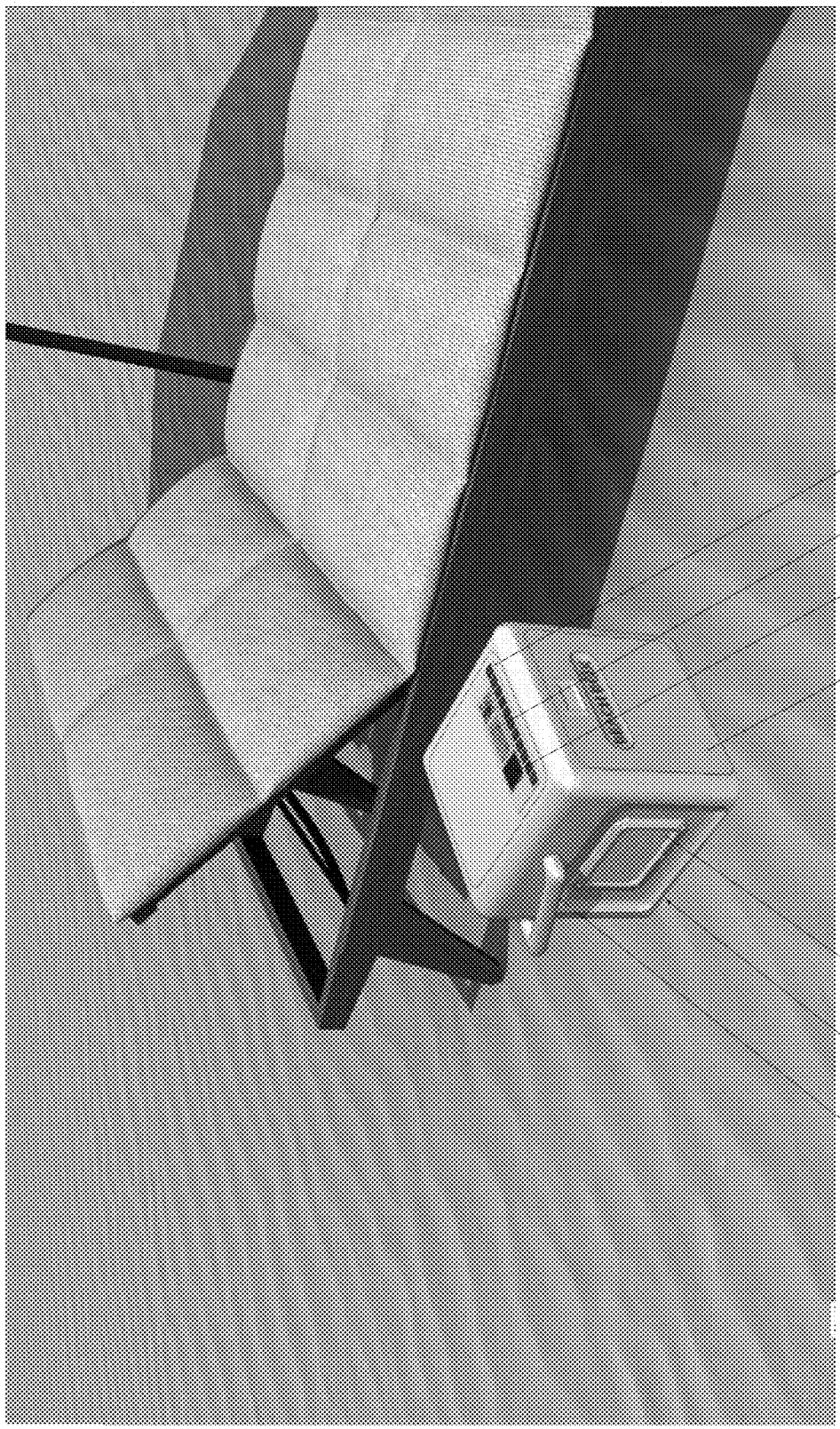
FIG. 1 is a conceptual diagram illustrating an exemplary embodiment of the lock box.

FIG. 1 is a conceptual diagram illustrating an exemplary embodiment of the lock box. In the illustrated embodiment, the lock box 100 is shown as being placed on the sand at the beach or similar location. Thus, it will be appreciated that advantageously, embodiments of the lock box can be resistant to environmental conditions such as sand, heat, moisture, etc. The illustrated lock box 100 is shown as including a handle 102, a display 104, a solar panel 106 and a keypad 108. Further, the illustrated embodiment of the lock box 100 includes a speaker 110 and an access door 112. It should be appreciated that in some embodiments, the lock box may be purely mechanical, however, in the illustrated embodiments described herein, the lock box 100 will be described as including a combination of mechanical elements and electronic elements that include a controller board with various interfaces and/or a processor or multi-function processor or processor board that includes firmware or software to facilitate the operation of the lock box 100. It should also be appreciated that the processor or processor board may include multiple processors or processor boards depending on the design of the particular lock box.

Figure 2:
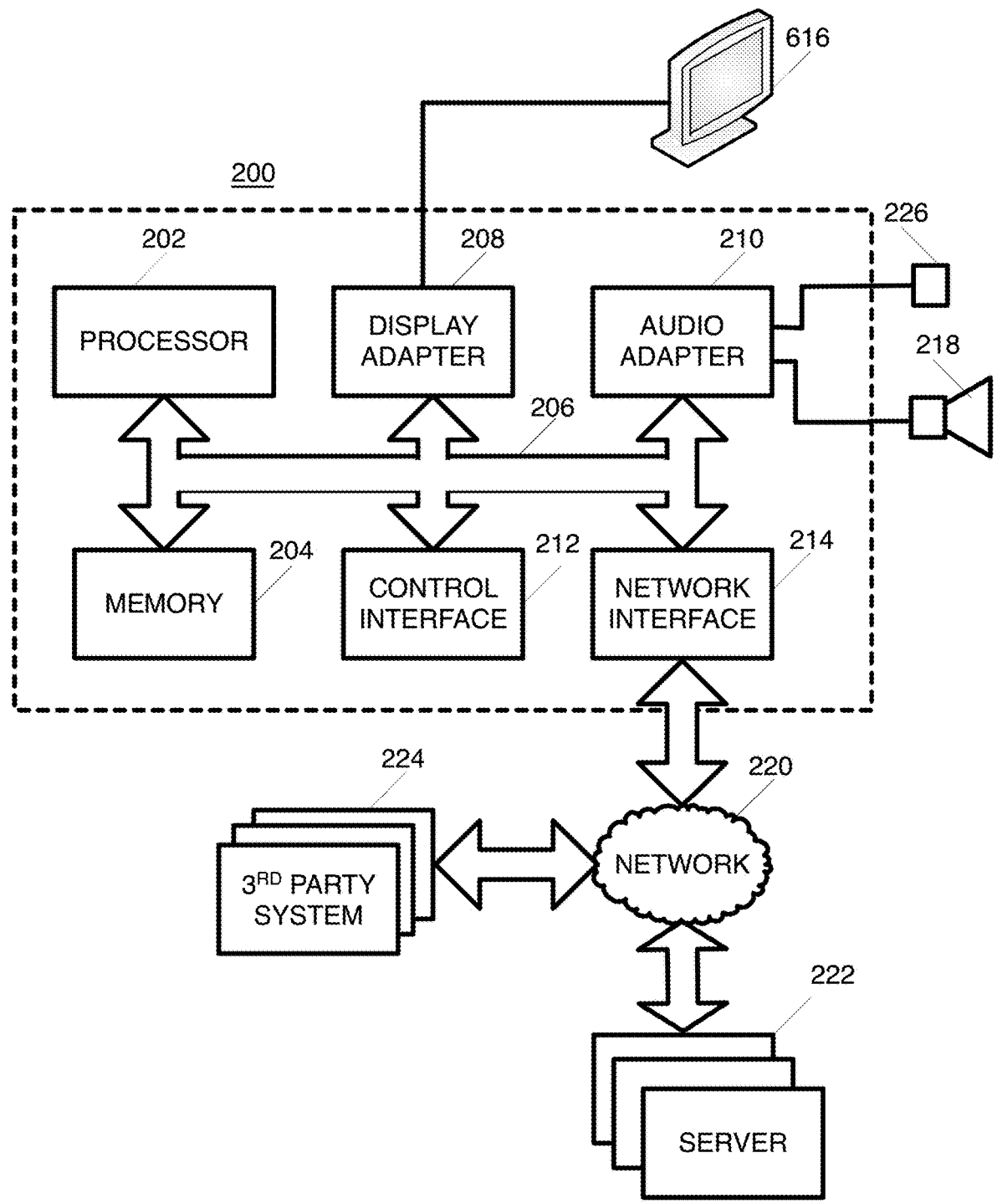
FIG. 2 is a functional block diagram of the components that may exist in an exemplary embodiment of a processor, processor board or controller board (collectively referred to as a controller) that could be used in various embodiments of the lock box 100.

FIG. 2 is a functional block diagram of the components that may exist in an exemplary embodiment of a processor, processor board or controller board (collectively referred to as a controller) that could be used in various embodiments of the lock box 100. It will be appreciated that not all components illustrated in FIG. 2 are required in all embodiments or implementations of the controller but, each of the components are presented and described in conjunction with FIG. 2 to provide a complete and overall understanding of the components. Further, while some of the functions or features of the controller may be illustrated in various blocks in FIG. 2, it should be appreciated that the functionality or features may also be implemented across multiple components of the illustrated components. Thus, the controller illustrated in FIG. 2 is provided to show only an example of an exemplary controller board and is not necessarily meant to be the only configuration or to illustrate the actual production of the controller.

The controller can include a general computing platform 200 illustrated as including a processor/memory device 202/204 that may be integrated with each other or, communicatively connected over a bus or similar interface 206. The processor 202 can be a variety of processor types including microprocessors, micro-controllers, programmable arrays, custom IC's etc., and may also include single or multiple processors with or without accelerators or the like. The memory element of 204 may include a variety of structures, including but not limited to RAM, ROM, magnetic media, optical media, bubble memory, FLASH memory, EPROM, EEPROM, etc. The processor 202, or other components in the controller may also provide components such as a real-time clock, analog to digital convertors, digital to analog convertors, etc. The processor 202 is also illustrated as optionally interfacing to a variety of elements including a control interface 212, a display adapter 208, an audio adapter 210, and network/device interface 214. The control interface 212 can be used to provide an interface to external controls or elements, such as sensors, actuators, GPS receiver, SPDT relays, the PSTN, BLUETOOTH transceivers, WIFI transceivers, a cellular network, pressure actuators, step motors, a keyboard, a mouse, a pin pad, an audio activated device, as well as a variety of the many other available input and output devices or, another computer or processing device or the like. The display adapter 208 can be used to drive a variety of alert elements 216, such as display devices including an LED display, LCD display, one or more LEDs or other display devices. The audio adapter 210 may interface to and drive a speaker, or another alert element 218, such as a speaker or speaker system, buzzer, bell, etc. The audio adapter 210 may also interface to an input element, such as a microphone 226. The optional network/interface 214 may interface to a network 220 which may be any type of network including, but not limited to the Internet, a global network, a wide area network, a local area network, a wired network, a wireless network or any other network type including hybrids. Through the network 220, or even directly, the controller 200 can interface to other devices or computing platforms such as one or more servers 222 and/or third-party systems 224. A battery or power source provides power for the controller 600. The power source may include an internal or external battery, a low voltage input, a 110 v input, a solar panel input, etc.

Figure 3:
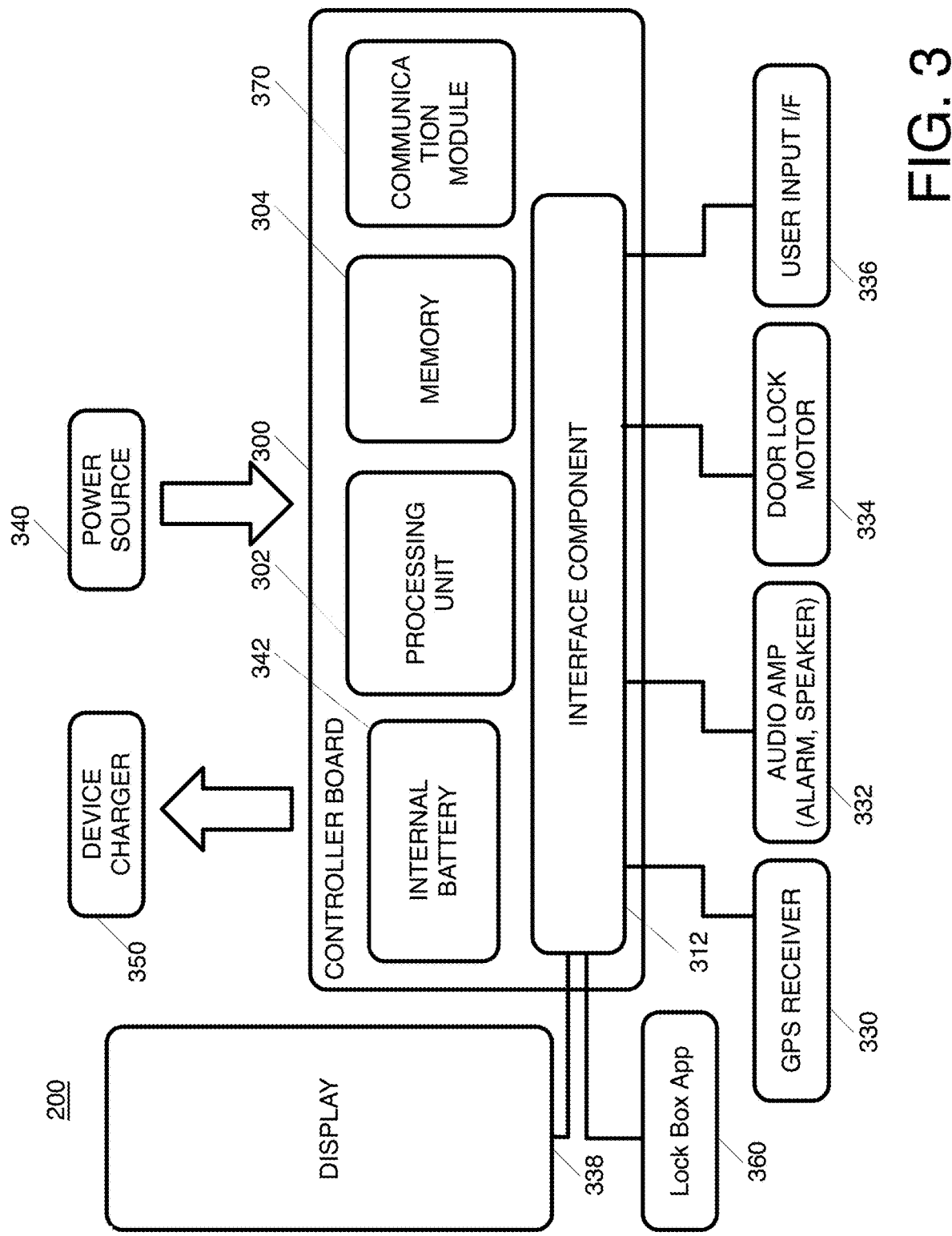
FIG. 3 is a block diagram illustrating an exemplary structure for the various electronic and mechanical elements that may be included in an exemplary embodiment of the lock box 100.

FIG. 3 is a block diagram illustrating an exemplary structure for the various electronic and mechanical elements that may be included in an exemplary embodiment of the lock box 100. In the illustrated embodiment, the controller board 300 is shown as including a processing unit 302, a memory element 304 and an interface component 312. In the illustrated embodiment, the interface component 312 can include the elements of a display adapter, audio adapter and general control or input/output interface elements. Thus, as illustrated in FIG. 3, the interface component, while shown as a single block, may include multiple physical interface elements that can be defined by hardware, software or a combination of both hardware and software. As such, the illustrated interface component 312 is shown as interfacing with a GPS receiver 330, an audio amp (optionally including an alarm and/or speaker and/or microphone) 332, a door motor lock 334, a user input 336 and a display 338.

The controller board 300 is also illustrated as interfacing to a power source 340. The power source 340 can be used to power the controller board 300, charge an internal battery 342 or both. The power source 340 can be any of a variety of sources, such as a 110 v AC current, a 110 v conversion to 5 v, etc. The power source 340 may be an external battery, a solar cell or solar panel, as a few non-limiting examples.

The controller board 300 is also illustrated as interfacing to a device charger 350. The device charger 350 may include a variety of interfaces, such as a USB port that phone charging cables can be connected to or a wireless phone charger that can be embedded in a top or side panel of the lock box 100 as a few non-limiting examples.

The controller board 300 is also illustrated as interfacing to a lock box app 360. The lock box app 360 may be a downloadable app available from the APP STORE or GOOGLE APP STORE, etc. Once the user downloads the lock box app to the user's mobile device and initiates the app for the first time, the lock box app 360 may register the user. The registration process may include entering the user's name, contact information, age verification, credit card or other payment information and other user preferences such as a default PIN, notification selections, access permissions for various elements of the mobile device (i.e., location information, camera function, etc.). It should be appreciated that in some embodiments, a simple remote device may be rented by a user that does not own or have a mobile device. The remote device may come preloaded with the lock box app.

The controller board 300 also includes a communication module 370. The communication module 370 is used to send out signals regarding the status and location of the lock box 100 and to receive control and commands from a remote system. This aspect or feature is described in greater detail in the description of FIG. 6.

Figure 4:
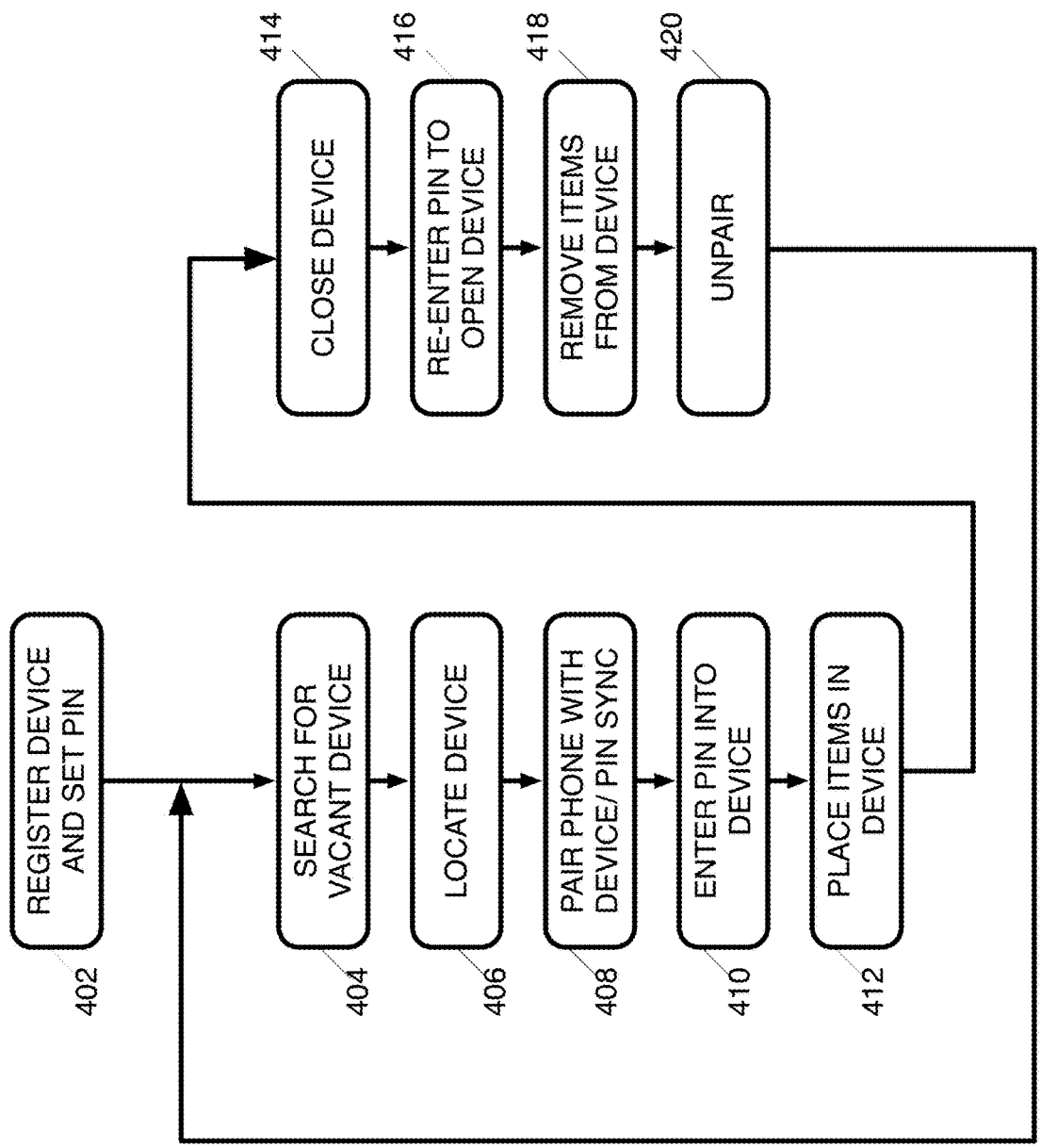
FIG. 4 is a flow diagram illustrating an exemplary operation of an embodiment of the lock box 100.

The various embodiments of the lock box 100 may include many different features, aspects and functions. FIG. 4 is a flow diagram illustrating an exemplary operation of an embodiment of the lock box 100. Initially, a user downloads the lock box app and registers with the system, such as a master server 402. During the registration session, the user may be prompted to enter profile information including but not limited to a, identification information, credit card information and a PIN. Once the user or the user's mobile phone is registered, the user searches for a vacant or available lock box 404. It should be appreciated that in some embodiments, the lock boxes 100 may be geo-located by a user desiring to utilize the lock box 100, however, in some embodiments, system may cause lock boxes 100 within the vicinity of the user to simply sound an alarm, flash a light, etc. The lock boxes may initially be housed at a central distribution center and then obtained by a user and carried by the user to a different location. Alternatively, some or all of the lock boxes may be deployed by the owner to strategic locations. In other embodiments, some or all of the lock boxes may simply be left in the location that they were last used. Regardless of the technique used to deploy the lock boxes 100, an advantage of various embodiments of the lock box 100 is that once a user is done using the lock box 100, the user can simply leave the lock box 100 at the location the user last used it. As such, a subsequent user can either obtain a lock box 100 from the central distribution center or find a lock box 100 that has already been deployed but is currently vacant or available for use. In such embodiments, a user may down load a lock box application (lock box app) to the user's mobile device, such as a smart phone, pad, notebook computer, etc. The user can then activate the lock box app, permit the lock box app to have access to the location of the user's device, and then the lock box app can enter a locate mode to search for available lock boxes 100 that are in the vicinity of the user. Thus, the lock box app can identify if any lock boxes 100 are available at the central distribution center as well as any deployed lock boxes that are currently vacant. Further, it should be appreciated that in some embodiments, a user can download the lock box app and enable notifications. This advantageously will allow the user to be automatically notified if he or she comes into a particular distance from an available lock box 100.

Figure 5:
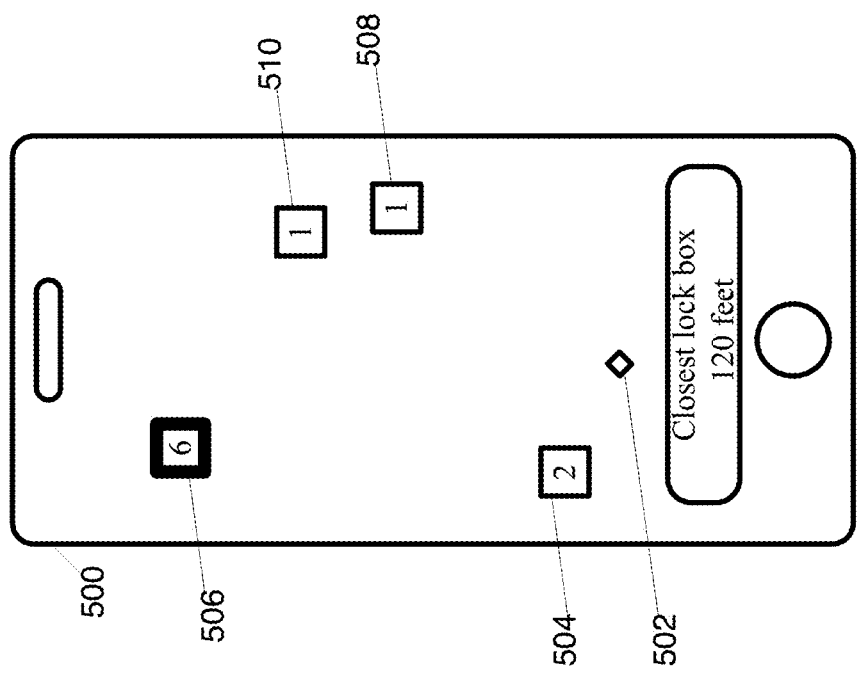
FIG. 5 is a conceptual illustration of a display screen of an exemplary lock box app showing the results of a lock box search.

FIG. 5 is a conceptual illustration of a display screen of an exemplary lock box app showing the results of a lock box search. In the illustrated display, the user's current location 502 is presented with a diamond. The location of vacant lock boxes is illustrated with a square box and number indicating how many vacant lock boxes are present at a particular location. The display may also include a message box to indicate the distance to the nearest lock box 100 and/or provide directions to the nearest lock box. Thus, at location 504, 2 vacant lock boxes are available, at location 506, 1 vacant lock box is available, at location 508, 1 vacant lock box is available and at location 506, 6 lock boxes are available. Further, location 6 is illustrated with a bolder box to indicate that this is a central distribution center. Thus, the user can follow the directions indicated on the display of device 500 to traverse to a desired lock box 100 or can travel to the central distribution center 506 to obtain a lock box 100 or to speak with a lock box distributor regarding how to use the lock box or obtain instructions. It should be understood by those of ordinary skill in the art that the display screen may include an overlay of a map with street names, points of reference, bathrooms, restaurants etc. such as what is available with GOOGLE MAPS, WAZE, etc. The lock box app may include an interface to a mapping app such as GOOGLE MAPS and WAZE. It should also be appreciated that additional information about the available lock boxes can be presented on the display such as, but not limited to, the color, size, features, etc. of the available lock boxes.

The lock box app 360 can obtain the location of the lock boxes by detecting signals that are transmitted by the lock box or, by accessing a master server that maintains and keeps track of the locations of each of the lock boxes.

Returning to FIG. 4, the user can then proceed to the location of the lock box 100 to finally find the desired lock box 406. Once the lock box 100 is located, the user can initiate access to the lock box. Accessing the lock box 100 can be done in a variety of manners. In the illustrated embodiment, the lock box 100 is accessed by the user pairing his or her mobile device with the lock box 100, such as with BLUETOOTH pairing. As such, embodiments of the lock box 100 may include a BLUETOOTH module that is configured to pair with other devices. In some embodiments, the lock box may include a QR code, bar code or other insignia that the user can scan with the camera or optical reader of the mobile device. The insignia may be permanently attached to the lock box 100 or it may be displayed on the screen of the lock box 100 and thus updated as necessary. As a non-limiting example, if the lock box app 360 is active, once the lock box 100 detects that the user is at the lock box 100, the lock box app 360 can prompt the user to pair the mobile device with the lock box 100. In some embodiments, the lock box app 360 may activate the camera of the mobile device and present a target window on the display of the mobile device along with instructions telling the user to aim the camera so that the QR code, bar code or other insignia is displayed within the target window. Once the QR code, etc., is visually displayed within the target window, the lock box app may automatically initiate pairing between the mobile device and the lock box or, prompt the user to activate a button or touch the screen to initiate the pairing.

In some embodiments, when the lock box 100 is vacant, it may be in an unlocked state. However, preferably the lock box 100 is in a locked state until the user pairs with the lock box 100. During the pairing process the PIN information entered during the registration process 402 is synchronized 408 with the lock box 100 (i.e., the lock box app 360 communicates with the controller 300 within the lock box 100 to transmit the PIN which is then stored within memory 304 or protected memory of the lock box 100). Once the synchronization is completed, the user can then enter the PIN into the lock box 100 device to gain access to the interior of the lock box 100. It should be appreciated that selection of the PIN may be done on the fly rather than during registration in some embodiments. For instance, if the user is not utilizing the lock box app 360, in some embodiments, the user can simply enter a PIN in accordance with provided instructions (such as a card or sticker attached to the lock box 100). If the user is utilizing the lock box app 360, the lock box app 360 can prompt the user to enter a PIN either by typing it into the mobile device or through the user interface of the lock box 100. If the user types the PIN into the mobile device, the lock box app 360 will interface with the lock box 100 and program the PIN into the lock box. This can be accomplished using a wireless connection such as BLUETOOTH, cellular data or any other wireless communication technique. In some embodiments, the lock box app 360 may have a previously assigned PIN that the user has selected when registering the app and the lock box app may automatically program the PIN into the lock box after or during pairing the lock box 100 and mobile device. In yet other embodiments, the lock box app 360 may gain access to the PIN that the user utilizes to unlock his or her mobile device and automatically program the lock box with that PIN.

Once the PIN is utilized to gain access to the lock box 100 (regardless of the technique for selecting the PIN), the user can place items 412 into the lock box 100. At this point, the user can close 414 the access panel 112 to the lock box 100. Upon detecting that the access panel 112 is closed, the lock box 100 and/or the lock box app 360 can cause the processing unit 302 to activate the door lock motor 334 through the interface component and cause the door lock to transition from an unlocked state to a locked state. It should be appreciated that the access panel 112 and the lock box 100 may include a sensor to detect when the access panel 112 is in the opened or closed state. Those skilled in the art will be aware of such sensors that can be utilized for this purpose.

At this point, processing unit 302 can activate the door lock motor 334 through the interface component and cause the door lock to transition from a locked state to an unlocked state. The door lock motor 334 drives a locking mechanism that is used to prevent the access panel from being opened while engaged. Those skilled in the art will be familiar with a wide variety of locking mechanisms including pins that can be vertically and/or horizontally slid into apertures or receiving element of the panel or from the panel into apertures of the container, as non-limiting examples.

When the user wishes to gain access to the interior of the lock box 100, the user can simply re-enter the PIN 416. Once the PIN is re-entered, the processing unit 302 can activate the door lock motor 334 through the interface component and cause the door lock to transition from the locked state to the unlocked state. Again, the user may enter the PIN using the interface on the lock box 100 or the mobile device if the user did not place the mobile device into the lock box 100.

Once the access panel is unlocked and opened, the user can remove 418 some or all of his or her belongings 114 from the lock box 100. If the user is done with the lock box 100, the user can unpair the user's mobile device and the lock box 420. The user can unpair 420 the mobile device and the lock box through the lock box app 360. The time that the mobile phone initially pairs with the lock box 100 and then unpairs can thus recorded by the lock box app 360 and can be provided to a back-end billing system for determining how much to charge the user in a time rental scenario and/or for tracking purposes to determine the level of utilization of lock boxes 100 for a particular demographic to help facilitate redistribution of the lock boxes 100 to maximize or increase utilization.

Figure 6:
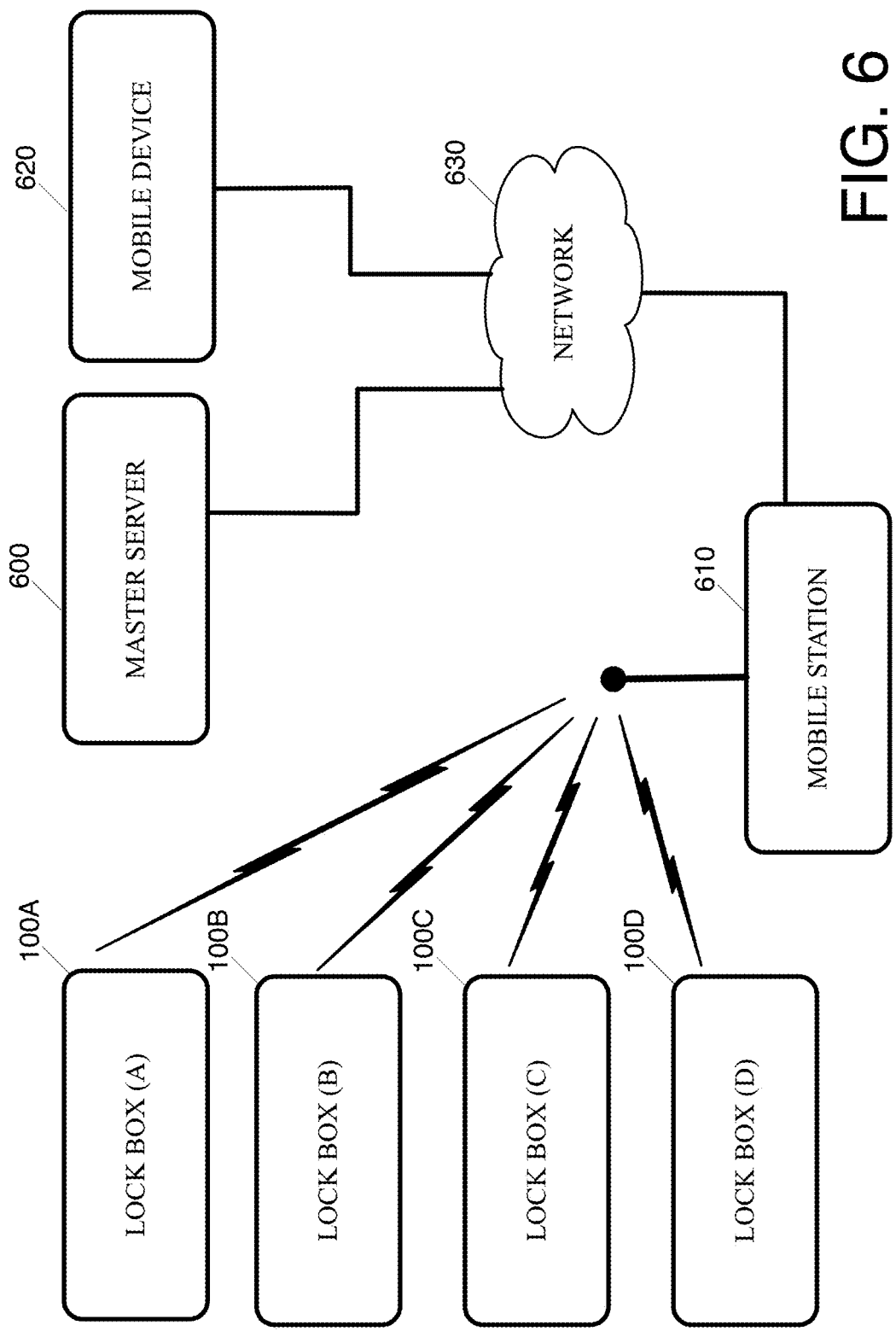
FIG. 6 is a block diagram illustrating an exemplary environment for the deployment and control of a fleet of lock boxes.

FIG. 6 is a block diagram illustrating an exemplary environment for the deployment and control of a fleet of lock boxes. The exemplary environment illustrates the deployment of 4 lock boxes (100A-D) although it will be appreciated that more or fewer lock boxes 100 may be deployed in the environment but the number 4 was selected only for illustrative purposes. Each of the lock boxes 100A-D may include one or more communication modules 370 as illustrated in FIG. 3. The communication modules may be of a variety of wireless based communication technologies and the selected technology would be dependent upon the particular application. For instance, if a WIFI network footprint is available over the entire geographic region that the lock boxes 100A-D are deployed, the communication modules may utilize WIFI technology. Similarly, if the geographic region is limited in scope, the communication modules may employ BLUETOOTH technology or some other unlicensed RF spectrum technology. In the illustrated environment, it is assumed that the communication modules include cellular communication technology. As such, each of the communication modules in such an environment would include the ability to place and receive calls over the cellular network or to utilize cellular data communication channels. Other embodiments may utilize the Internet of Things (IOT) modules or any other communication technology. Further, cellular micro cells may be positioned within the geographic region to allow the communication module to use a non-cellular communication technology to connect to the cellular micro cells and the cellular micro cells would then communicate over the cellular network.

In the illustrated environment, the lock boxes 100A-D can engage in bi-directional communication with a mobile station 610. The mobile station 610 is then connected through a network, such as a telecommunications network or the public switched telephone network ("PSTN") 630 to a master server 600. A mobile device 620 is also communicatively coupled to the master server 600, the mobile station 610 and optionally, each of the lock boxes 100A-D through the telecommunications network 630. Although only one mobile device 620 is illustrated, it will be appreciated that the environment would support multiple mobile devices.

In operation, each of the lock boxes 100A-D would be provisioned by a communications service provider and registered with the master server 600. As a non-limiting example, the registration process may include causing a lock box 100 to initiate communication with the master server 600 through the mobile station 610 and the telecommunications network 630. For instance, the lock box 100 may place a call or send an SMS message to a phone number associated with the master server 600. The communication to the master server 600 may include a unique ID assigned to the lock box 100, a status of the lock box (such as locked, unlocked, opened, closed, reserved, battery power level, location, etc.). Once registered, the master server 600 can enable the lock box 100 for operation. It should be understood that the registration may also be initiated by the master server 600 in some embodiments. In such an embodiment, the master server 600 can initiate communication with a particular lock box of the lock boxes 100A-D using a phone number assigned to a particular lock box. In either case, it should be appreciated that the master server 600 and the lock boxes 100A-D can initiate, receive and engage in bi-directional communication with each other. In some embodiments, only uni-directional communication may be used.

The master server 600 can maintain a list and status of each of the lock boxes 100A-D and to which operator or owner the lock box 100 is assigned. In addition, the master server 600 can send an announcement message to one or more of the lock boxes 100. Upon receipt of an announcement message from the master server 600, the controller 300 within a lock box 100 can display the announcement or sound the announcement over the speaker or both. For instance, the master server 600 can send a message to alert users that severe weather is approaching, or that all lock boxes need to be returned to central distribution, or that a particular lock box needs to be recharged, or that a lock box alarm is being sounded indicating that one of the lock boxes in the vicinity is being moved so the other users can look for the culprit, etc.

The mobile device 620, running a lock box app 360, may initiate communication with the master server 600, such as requesting a lock box locator function to identify the location of one or more lock boxes in the vicinity of the mobile device 620.

Having described the general operation of an exemplary embodiment of the lock box 100, additional features and functionality can be better understood. It should be appreciated that any particular embodiment of the lock box may include each of the previously described features or may omit one or more of the previously described features. Likewise, any particular embodiment may also include or omit any of the additional features and functions that are described in the next sections.

System Manager App—It should be appreciated that as users access and use the lock boxes 100, that the lock boxes 100 may be spread out over a geographical area. If the lock box operator (which may include an owner, a franchisee, etc.) wishes to collect the lock boxes 100 at the end of a period of time (such as the end of the day), locate the lock boxes 100, verify operation of the lock boxes 100, determine the current state of the lock boxes 100, sound an alarm for the lock box 100, etc., the owner may require capabilities that are not included in the lock box app 360. Thus, the owner may have access to a system manager app, which could be a stand-alone downloadable app or, may be implemented as additional features within the standard lock box app 360 that can only be accessed or are enabled only for an owner. In the latter example, a special login or access code may be used to access the additional capabilities. For instance, the lock box app 360 only presents the location of vacant lock boxes 100 to a normal user. However, the owner may want to know the location of all of his or her lock boxes 100 regardless as to if the boxes 100 are vacant or occupied. The system manager app can thus present the location and the state of each of the owners' lock boxes. In addition, a geographical region may include lock boxes that belong to different owners. The lock box app 360 may display all of the local and available lock boxes, whereas the owner may only want to see the location of his or her lock boxes. As such, the system manager app may include a filter that only displays lock boxes that belong to the owner. This can be accomplished in several manners, including assigning a unique ID code to each lock box 100 and having the unique ID's associated with a particular owner. In addition, the master server 600 may keep track of all of the lock boxes that have been deployed or put into commerce and the system manager app may access the master server to obtain information about the lock boxes that are assigned or associated with that particular owner.

Geo-fencing and Alarm—Exemplary lock boxes 100 may be equipped with a GPS receiver 330 to identify the current location of the lock box 100. Because the lock boxes 100 are mobile, it is advantageous to determine if a lock box 100 is being moved (such as being accidentally taken by another use or actually being stolen. Each lock box 100 may include the definition of a geographic zone or geo-fence in which the lock box 100 is allowed to reside. Thus, the controller 300 can identify a current location and store that as an anchor point. For example, the anchor point can be set at the time that the mobile device 620 is paired with the lock box 100, when the lock box 100 is closed and locked or some other triggering event. If the lock box 100 is moved, the controller 300 can identify the current location and determine if it is the same or different as the anchor point. If the current location is different from the anchor point, then the controller 300 knows that the lock box 100 has been moved or is being moved. If the lock box 100 is being transported near or across the boundary of this geo-fence, the lock box 100 can sound an alarm. The intelligence for the geo-fence may reside completely within the lock box 100 or may be implemented within the master server 600. It should be appreciated that a vacant lock box 100 may have a wider geo-fence area than a lock box 100 that is in use (i.e., is safe keeping a user's valuables). As such, one geo-fence definition may apply if the lock box 100 is vacant and another geo-fence definition may apply if the lock box 100 is in use. A threshold or multiple thresholds may be defined regarding the alarming for a lock box 100. For instance, a warning threshold may be set to sound an alarm if the lock box 100 is moved from the anchor point to a location exceeding the warning threshold. As an example, crossing the warning threshold may cause the lock box to pronounce a warning message such as "you have moved the lock box too far, if you continue authorities will be notified". An alarm threshold may be set to be higher than the warning threshold. If the alarm threshold is exceeded, the lock box 100 may automatically send an alarm to the master server and/or sound a loud, highly noticeable alarm sound designed to draw attention and/or cause messages or alarms to be sent to other lock boxes 100 within the vicinity so that other users can be on the lookout. This may also include an audible message such as "this lock box is being stolen, return it immediately to the previous location". It should be appreciated that the lock box 100 and/or the master server 600 may also initiate a communication with law enforcement that a lock box 100 is being stolen and provide continuous location updates of the lock box 100. It should also be appreciated that rather than an audible alarm, the lock box 100 may sound a silent alarm by notifying the master server, owner or authorities. Advantageously, this feature in an exemplary lock box 100 would not put a potential thief on notice that he or she was being pursued. The GPS elements should account for GPS drift. In addition, the lock box 100 may be enabled to sound an alert or alarm under other conditions, such as the lock box 100 is tipped over or is being overcome by environmental elements, needs charging, needs to be returned, etc.

Other Alarm/Safety Features.

Strobe Alarm. The lock box 100 may also include an external strobe light that can be used to indicate an alarm condition. As such, if an alarm condition is triggered, in addition to, or in lieu of an audible alarm, the strobe light can be used to indicate that the box is being stolen. This feature may also be useful for identifying the location of the lock box 100 for a user seeking a vacant lock box or for authorities or owners to track down a thief.

Open Box Alarm. If the lock box 100 is opened and remains open, this may be a condition that needs to invoke an alarm. For instance, if the user puts his or her valuables into the lock box 100 but forgets to close the lock box 100 or does not close the access panel 112 all the way, the lock box 100 can alert the user by sounding an alarm or reciting a message such as "don't forget to close and lock the access panel". This feature can be implemented with a threshold time and once the time is crossed (such as 5 minutes) then the lock box 100 can sound the alarm or alert.

Automatic door shutting. In addition to a motor used to lock and unlock the access panel 112, embodiments may include an automatic door opener and/or closer. For instance, if the lock box 100 remains open for a threshold period of time, the controller 300 may actuate the door closer to automatically close and lock the lock box 100. In addition, after a user enters the PIN, the controller 300 may actuate the door opener to automatically open the access panel 112.

Safety Light. Some embodiments may also include a safety light that can be activated to help the user find his or her lock box 100 or to help the user navigate back to the central distribution center if the user stays out after dark. The light can also be used to indicate if the lock box 100 is open or closed. If the lock box 100 is open, the light is illuminated and if the lock box 100 is closed, the light is turned off. Some embodiments may include colored LEDs such that one color may indicate the lock box 100 is opened and another color indicate that the lock box 100 is closed. In addition, an internal light may illuminate when the lock box 100 is open to facilitate seeing the contents.

Security Camera. Some embodiments of the lock box 100 may include one or more external cameras to allow the master server 600 to monitor the location and activity surrounding the lock box 100. In addition, the camera can snap a photo each time a lock box 100 is registered, opened, locked or moved beyond a threshold location.

Location Tracker. Embodiments of the lock box 100 can maintain a history of where and when and how long the lock box 100 was in a particular location. This information may be stored within the memory of the lock box 100 and extracted, and/or it can be transmitted to the master server 600.

Refrigerator and/or Cooler.

In some embodiments, the lock box 100 may be constructed from an insulating material to help keep items within the lock box 100 at their current temperature. For instance, the lock box 100 may retard temperature changes of cold items or hot items that are placed within the lock box 100. In addition, the lock box 100 may include a cold compartment and a hot compartment so that the lock box 100 can house both cold drinks and warm food items. Other embodiments may include compartments for beverages and/or food items and/or valuables to hold them all separately. In other embodiments, the lock box 100 may include a heating element and/or a cooling element. Such embodiments would require a more powerful source of power and so, they may need a larger solar panel or to be plugged into a 110 v AC outlet.

Mobile Device Emulator. In some embodiments of the lock box 100, the lock box 100 may interface to a mobile device 620 that is placed within the lock box 100 and emulate the user interface of the mobile device 620 similar to a wired or wireless docking station. In such embodiments, the operation of a mobile device 620 within the lock box 100 can be completely or partially controlled using the user interface on the exterior of the lock box 100. In such embodiments, a user can place and receive calls and texts from the user's mobile device 620 by utilizing the user interface, the speaker and the microphone of the lock box and the lock box would control the operation of the mobile device. In some embodiments, the display on the lock box 100 may be configured to be the same look and feel as the display on the mobile device 620 including touch screen, etc.

SIRI/ALEXA or APPLE/GOOGLE HOME Equipped. In some embodiments, SIRI/ALEXA or APPLE/GOOGLE home capabilities may be built into the lock box 100. Advantageously, such embodiments would allow further control of the lock box 100 as well as the mobile device 620 that may be stored therein.

Forgotten PIN. It happens, a user will eventually forget what his or her PIN is and thus will not be able to access the contents of the lock box 100. Some embodiments may allow the user to interact with the master server 600 to recover a lost PIN. For instance, the user profile may include one or more challenge questions, similar to password recovery, that allows the user to interact directly with the lock box 100 or the master server 600 to recover from a forgotten PIN. In some embodiments, once the challenge questions are correctly answered, the lock box can be opened.

Content Detection. In some embodiments, sensor can be utilized to detect if a lock box 100 has contents within it or if it is empty. This can be useful if a user fails to unpair with the lock box 100. Thus, if the lock box 100 is locked and listed as reserved for an extended period of time but, no items are within the lock box 100, the lock box can automatically reset or reset under master server 600 control to a vacant state. The sensor may include optical sensors, cameras, weight sensors, etc. as a few non-limiting examples.

Figure 7:
FIG. 7 is a conceptual diagram of a lock box user interface panel. In the illustrated embodiment, the display panel shows the use of a QR code for pairing the lock box with a mobile device.

FIG. 7 is a conceptual diagram of a lock box user interface panel. In the illustrated embodiment, the display panel shows the use of a QR code for pairing the lock box with a mobile device.

Figure 8:
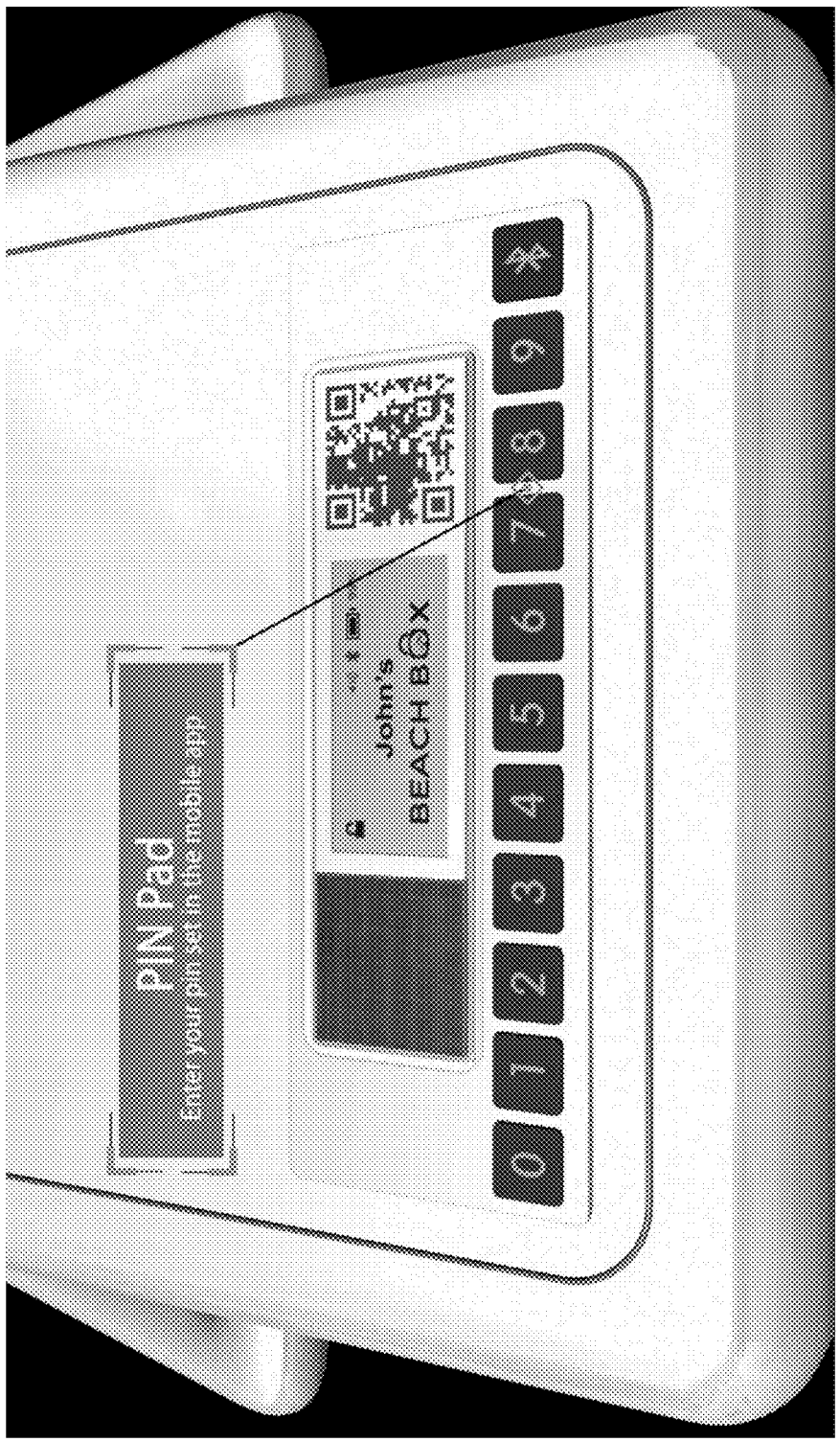
FIG. 8 is a conceptual diagram of a lock box user interface including a PIN pad entry panel or control panel.

FIG. 8 is a conceptual diagram of a lock box user interface including a PIN pad entry panel or control panel. In the illustrated embodiment, key entries labeled 0-9 are provided for the entrance of a PIN code or other controls to operate the lock box 100.

Figure 9:
FIG. 9 is a conceptual diagram of the interior of a single compartment lock box.

FIG. 9 is a conceptual diagram of the interior of a single compartment lock box. In the illustrated embodiment, the access panel is on the side of the lock box 100 and it illustrated contents that have been placed within the lock box 100. It should be appreciated that the access panel 112 may be located on the side of the lock box 100, as illustrated, on the top of the lock box 100 (more suitable for lock boxes that can be used as a cooler), or both. In addition, the size of the panel may be reduced and/or a pull-out drawer structure could be utilized.

Figure 10:
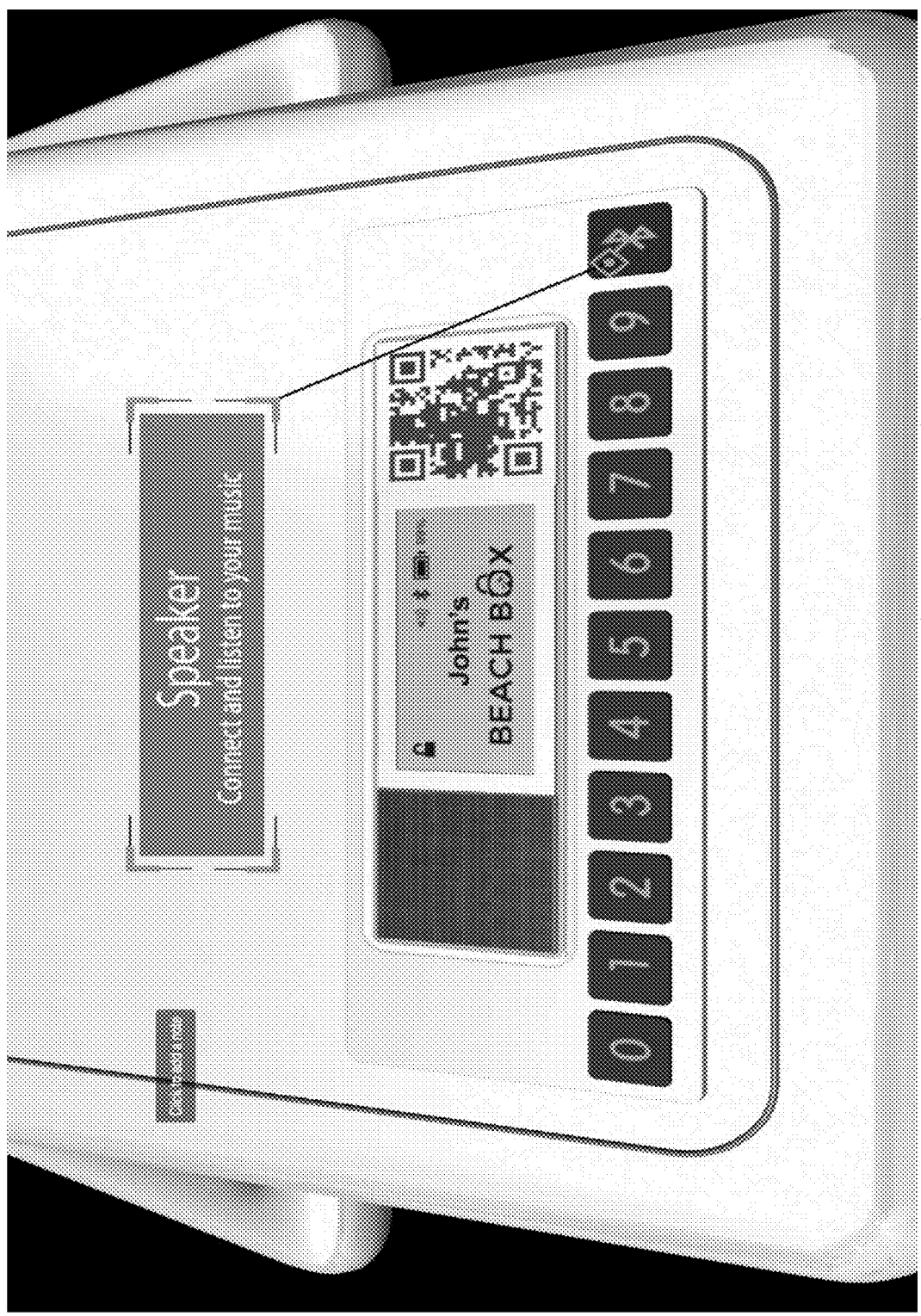
FIG. 10 is a conceptual diagram of a lock box user interface including a BLUETOOTH button.

FIG. 10 is a conceptual diagram of a lock box user interface including a BLUETOOTH button. The BLUETOOTH button can be used to initiate pairing of a BLUETOOTH enabled device to the speaker of the lock box 100.

Figure 11:
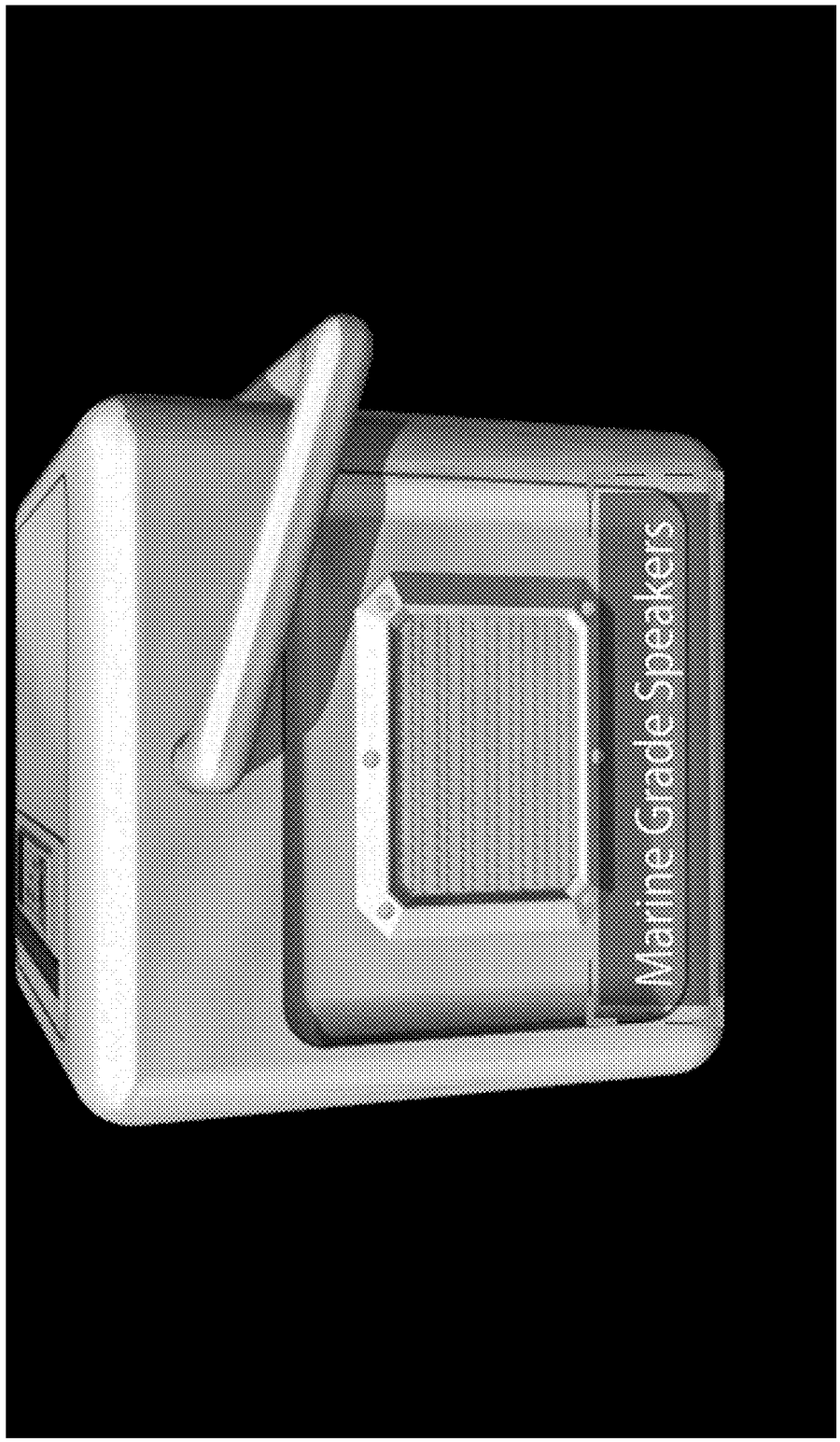
FIG. 11 is a conceptual diagram of a lock box including an external speaker.

FIG. 11 is a conceptual diagram of a lock box including an external speaker. The external speaker may be of a marine grade to allow the speaker to exist in humid and wet environments. The speaker may be used for any of the functions described above, such as sounding alarms or messages, playing music, emulation of the mobile device or other uses.

Figure 12:
FIG. 12 is a conceptual diagram of a lock box including an external charger port.

FIG. 12 is a conceptual diagram of a lock box including an external charger port. The external charger port can be connected to a power source for charging and/or operating the lock box 100.

Figure 13:
FIG. 13 is a conceptual diagram of a lock box including a solar panel.

FIG. 13 is a conceptual diagram of a lock box including a solar panel. The solar panel can be used to maintain charge of an internal battery for operation of the lock box.

Figure 14:
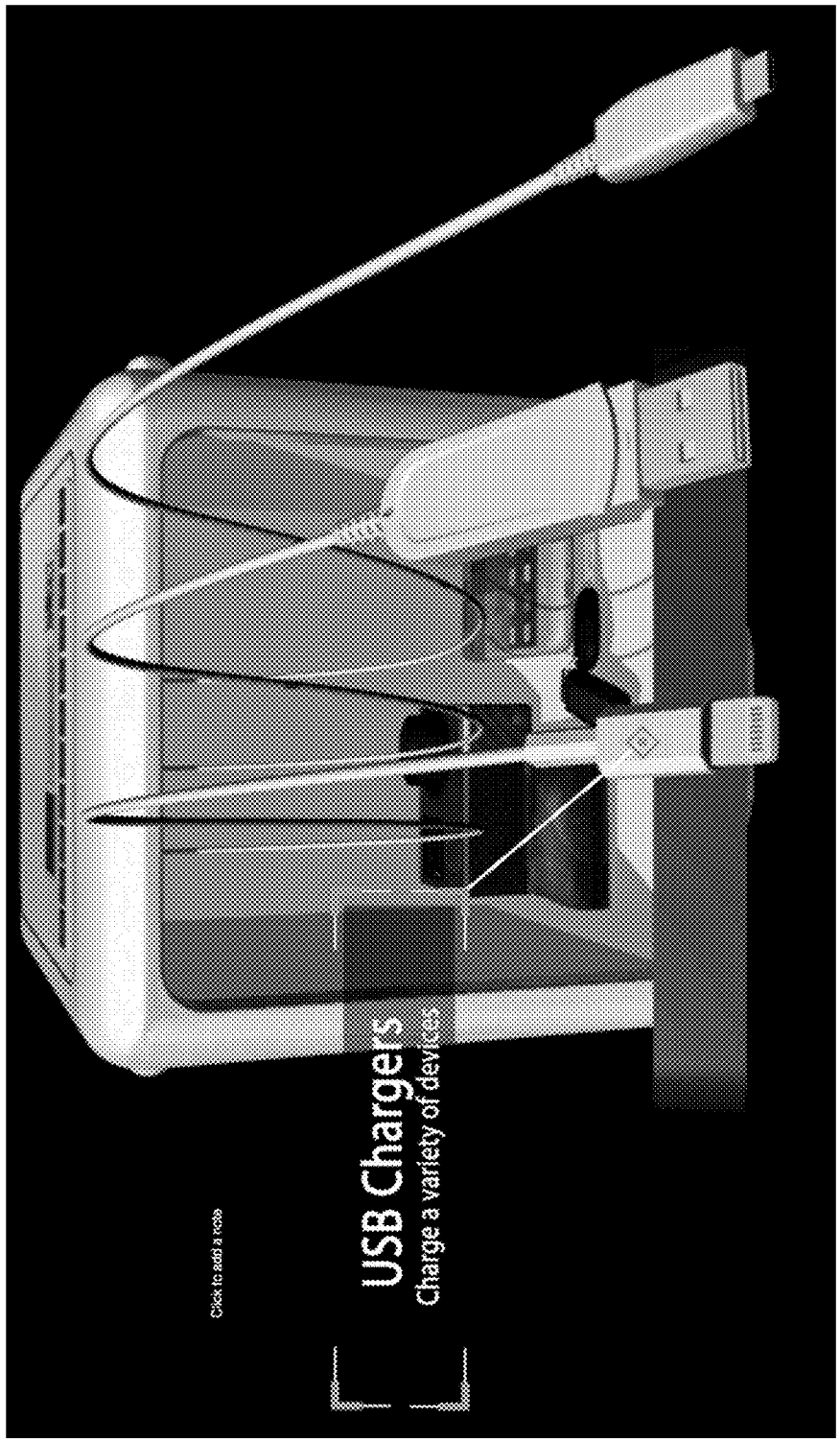
FIG. 14 is a conceptual diagram of a lock box including charging cables and ports for a variety of charging needs.

FIG. 14 is a conceptual diagram of a lock box including charging cables and ports for a variety of charging needs. The illustrated embodiment includes ports that are located within the lock box 100 that can be used to charge items that are placed within the lock box. It should be appreciated that one or more embodiments may also include external ports so that a user can charge a device external to the lock box 100.

Figure 15:
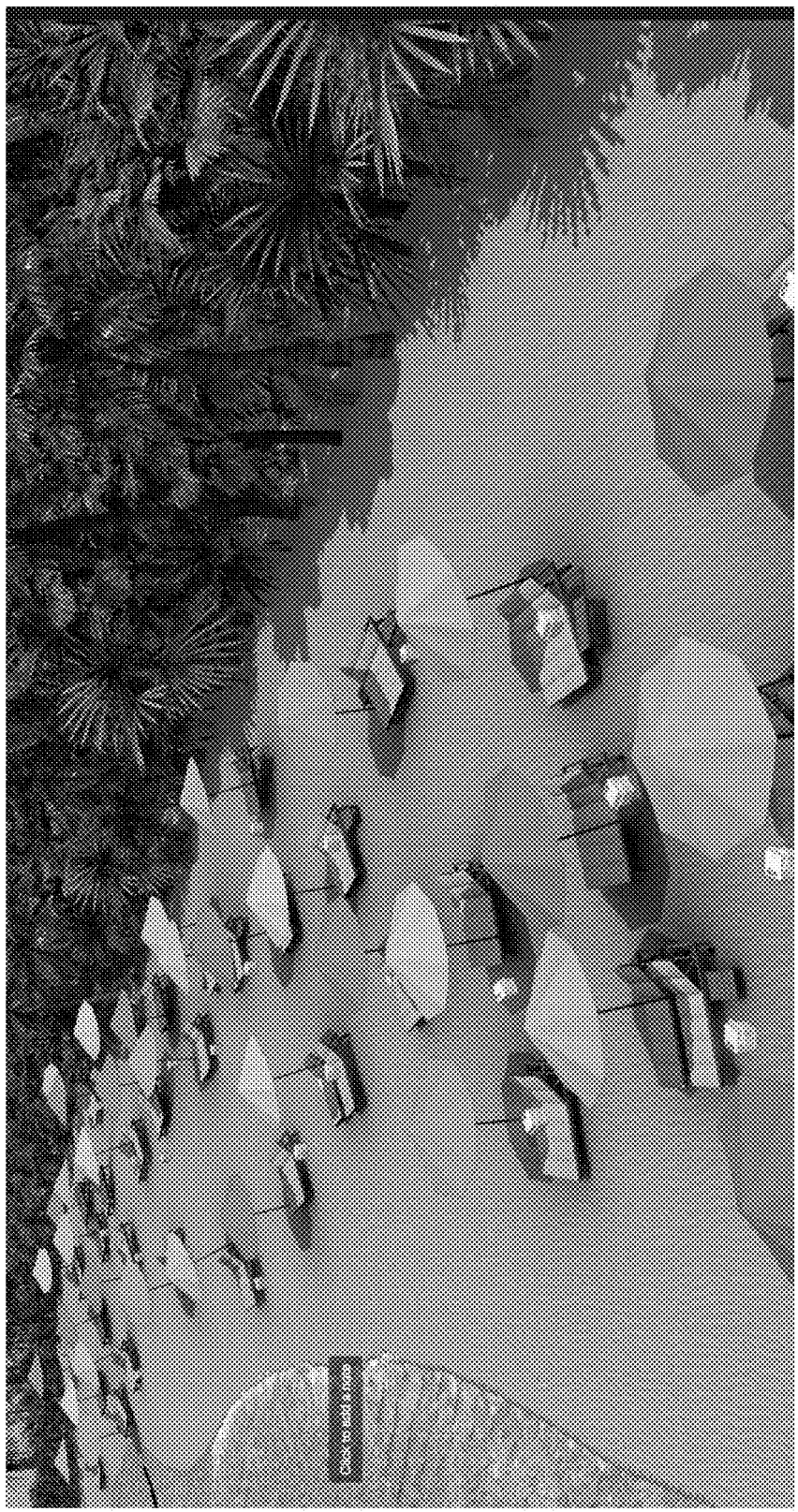
FIG. 15 is a conceptual diagram of a geographic area that includes a deployment of a fleet of lock boxes.

FIG. 15 is a conceptual diagram of a geographic area that includes a deployment of a fleet of lock boxes. The illustrated lock boxes may be vacant or in use and a user, operating the lock box app can navigate through the geographic area to find and locate a vacant lock box.

While the afore-described embodiments have focused on lock boxes that are geographically dispersed, it should be appreciated that in some embodiments, the lock boxes may be stored in locker banks that may be located in a centralized area or a location easily accessible to patrons in the area. For instance, at a public beach, the locker bank may be located near a wash room or changing room, bathrooms, vendor site or at a location on the beach. The locker bank may also include a kiosk that users can utilize to register for and check out a lock box. The locker bank may be modular, such that lockers can easily be added or removed to accommodate various use patterns for that location.

Figure 16:
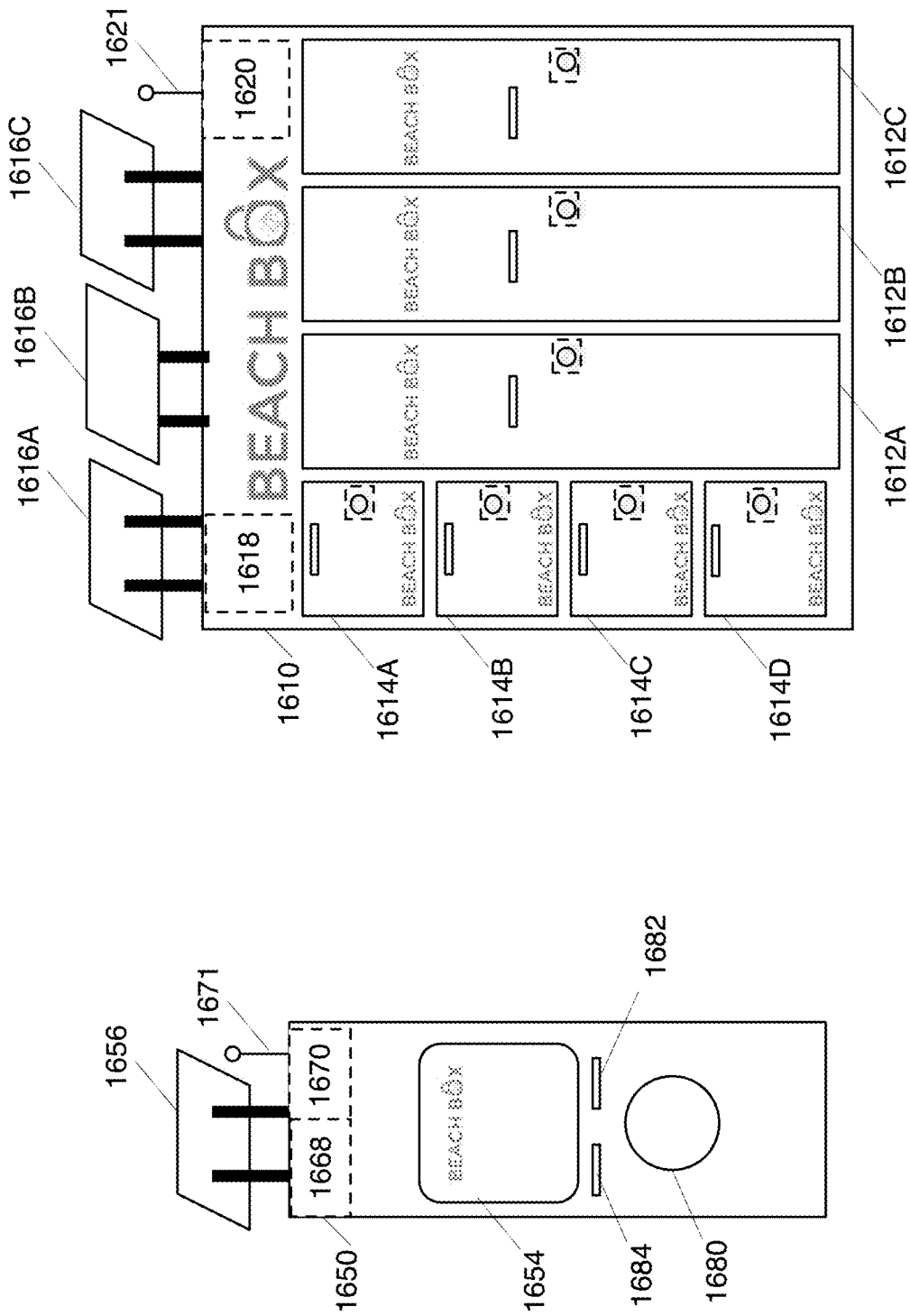
FIG. 16 is a conceptual diagram of a deployment of a locker bank and kiosk with each of the lockers being in a closed state.

FIG. 16 is a conceptual diagram of a deployment of a locker bank and kiosk with each of the lockers being in a closed state. The locker bank 1610 is illustrated as including 3 full-sized locker 1612A, 1612B and 1612C (collectively and individually referred to as 1612), and 4 cubby hole lockers 1614A, 1614B, 1614C and 1614D (collectively and individually referred to as 1614). Each of the locker doors in the locker bank 1610 are illustrated as being closed/locked. A kiosk 1650 is proximate to the locker bank 1610, although it will be appreciated that as long as the kiosk 1650 is communicatively coupled to the locker bank 1610, there is no specific distance requirement between the kiosk 1650 and the locker bank 1610.

In the illustrated embodiment, the locker bank 1610 includes one or more solar panels 1616(A-C) (collectively 1616) for receiving solar energy and converting it to charge a battery or battery bank 1618. As illustrated, the solar panels 1616A and 1616C are in a different orientation than solar panel 1616B to receive solar exposure at different times of day. In some embodiments, the solar panels 1616 may be manually adjustable, electronically adjustable or automatically adjust based on the time of day or location of the sun. Further, some embodiments may utilize a direct power source, such as an AC outlet as the primary power source and utilize the solar converted energy and battery stored charge for times when the AC power source is not available.

The locker bank 1610 also includes a communications system and a control system 1620, including an antenna 1621. The communications system and control system 1620 include a transceiver for receiving and transmitting signals through antenna 1621 as well as logic circuits for controlling the state of the lockers, and providing feedback on individual locker door displays (best illustrated in FIG. 17.

Figure 17:
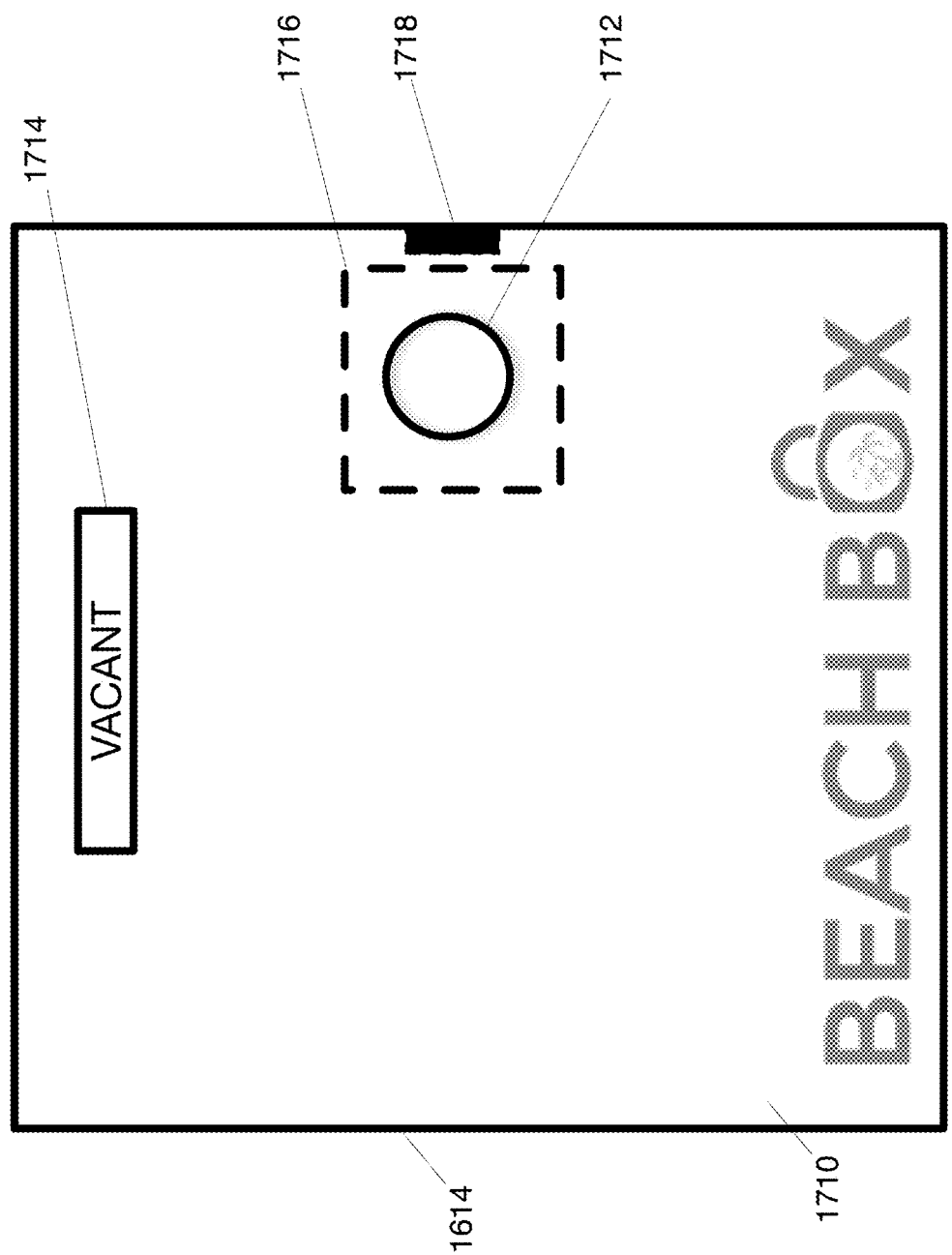
FIG. 17 is illustrates a conceptual view of the front panel of an exemplary cubby hole locker 1614.

FIG. 17 is illustrates a conceptual view of the front panel of an exemplary cubby hole locker 1614. The outer face of the locker door 1710 includes an access handle 1712 and a display device 1714. The display device may be a graphical display device, an LCD screen, an LED 7-segment device, individual LEDs, a single multi-colored LED or simply a single LED. In the illustrated embodiment, the display device 1714 of the locker 1614 displays the word VACANT (or a similar indicia) to indicate that the locker is available to a patron. However other words, symbols or labels may also be utilized. The display can also be used to indicate that the locker is in use, unlocked, out of order, out of service, etc. The access handle 1712 may simply be a knob or handle, but it is anticipated that it may also be a standard dial locker combination handle for manual access. Each locker in the locker bank 1610 includes a lock 1718. Each locker in the locker bank 1610 also includes a communications/control box 1716. The locker communications/control box (LCB) may be mounted to the inside face of the locker door 1710 or it may be located within an area of the locker bank 1610 and communicatively coupled to one or more components of the locker door, such as the display device 1714 and the lock 1718. It should be appreciated that rather than utilizing a display device for each locker, a single display device, such as an LED screen may be located on a surface of the locker bank 1610 to display the state and location of each locker. In addition, in some embodiments a display device may be completely omitted. In other embodiments, the display device may be replaced by or include a audible indicator, such as a buzzer or bell. Further, while each locker is illustrated as including the LCB 1716, all of the control and status checking of the locker bank 1610 may be handled by the single control system 1620 being either wired or wireless interfaced to the various locker components (i.e., display device 1714 and lock 1718).

Returning to FIG. 16, the kiosk 1650 can be utilized to reserve a locker in the locker bank 1610, check the status of a locker, identify an available locker, etc. The illustrated kiosk 1650 includes a display screen 1654, a control system 1670 with antenna 1671, one or more solar panel 1656, one or more batteries 1668 to be charged from the solar panels 1656, a speaker/microphone 1680, a card reader 1682 and a receipt printer 1684. In the illustrated embodiment the display screen 1654 is a touch screen but in other embodiments a keyboard or one or more entry buttons can be used for information input, as well as the microphone for receiving audio input.

Figure 18:
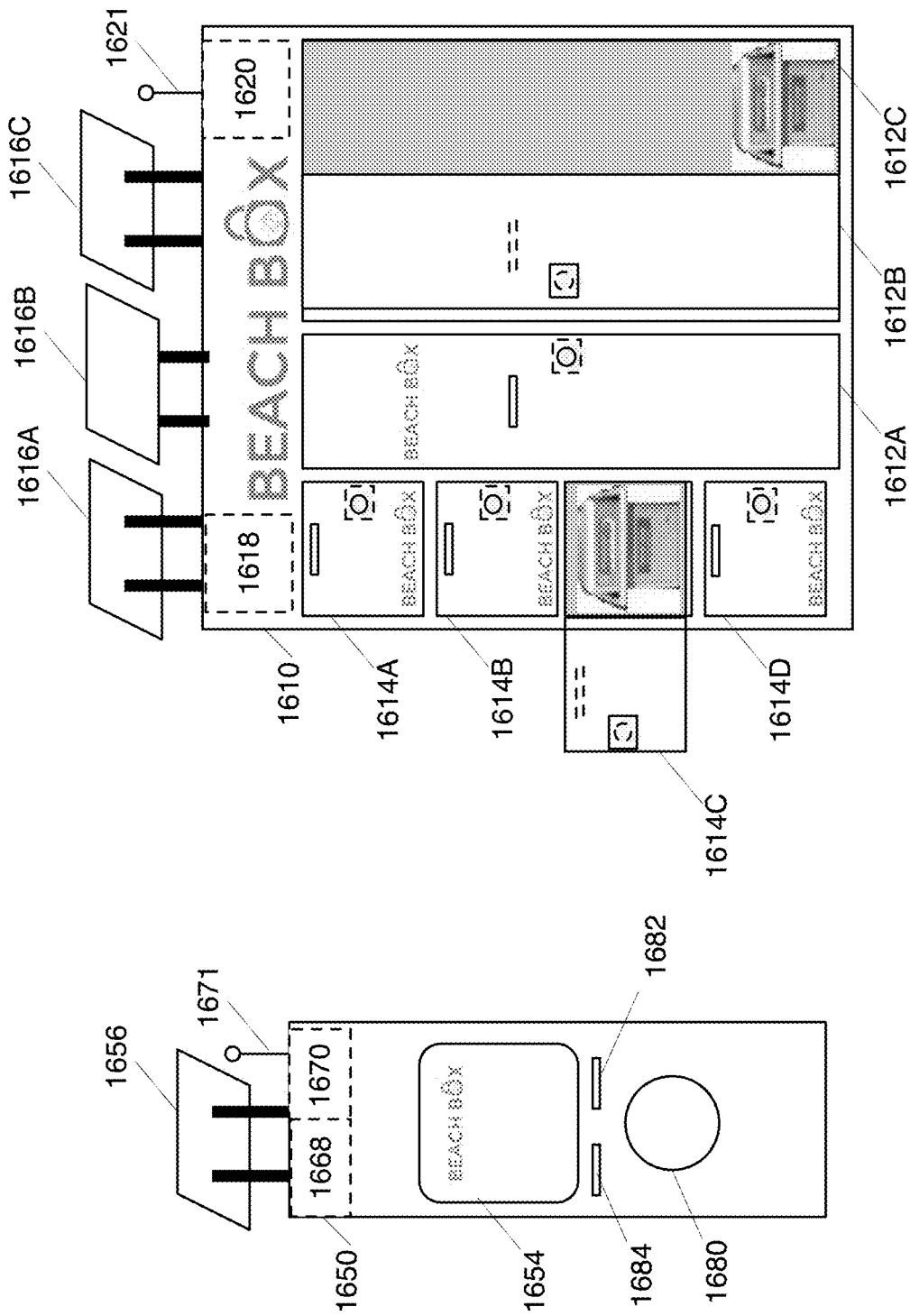
FIG. 18 is a conceptual diagram of a deployment of a locker bank and kiosk with select lockers being in an open state.

FIG. 18 is a conceptual diagram of a deployment of a locker bank and kiosk with select lockers being in an open state. In the illustrated embodiment, locker 1612C and 1614C have been opened, revealing a lock box 100 that can be removed and taken to the patron's desired location. Further, the patron can insert other items into the locker, close the door and have those items secured as well.

Figure 19:
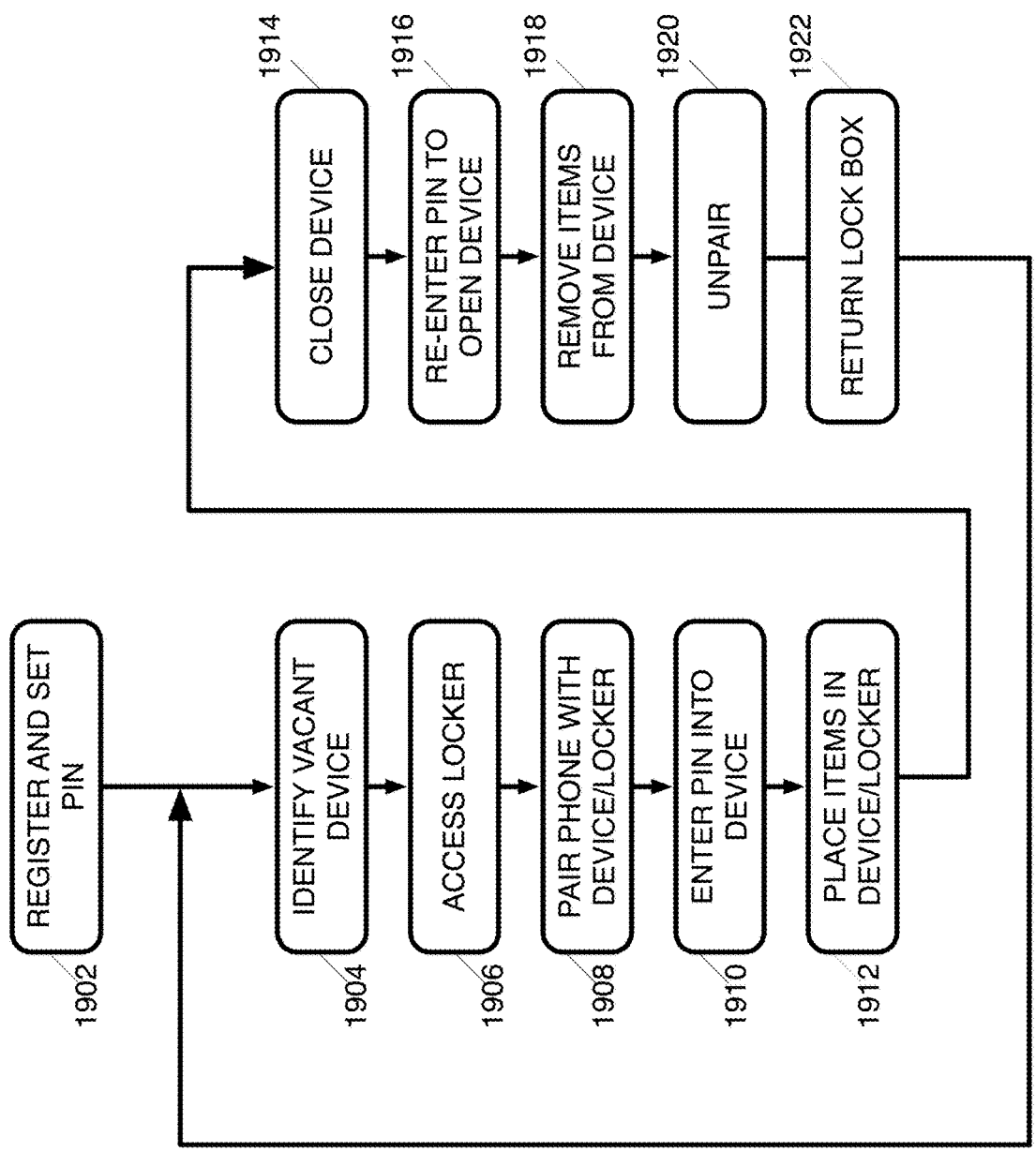
FIG. 19 is a flow diagram illustrating an exemplary method for a patron to acquire or rent a lock box from a locker bank.

FIG. 19 is a flow diagram illustrating an exemplary method for a patron to acquire or rent a lock box from a locker bank. The flow diagram is similar to the flow diagram of FIG. 4 with a few modifications. Ultimately, a user can download and install the lock box app, although this step can be performed at a later stage in the process. However, similar to FIG. 4, the lock box app is used by the patron to register with the system, such as a master server 600 (FIG. 6). However, in the locker bank embodiments, the user may also or alternatively perform the registration process using the kiosk 1650. In either case, during the registration session, the user may be prompted to enter profile information including but not limited to an identification information, credit card information and a PIN. Once the user or the user's mobile phone is registered, the user can identify an available or vacant lock box by either searching for a vacant or available lock box using the mobile app and/or the user can be notified of available lock boxes on the display of the kiosk 1650, which may display to the user the locker identification of an available locker and locker bank identification where the available locker may be found. If the user selects a locker bank lock box, that locker can then be reserved for the user. The reservation may have an expiration date/time such that the user must access the locker before the expiration, otherwise the reservation can be cancelled and the locker made available to someone else. The user may be prompted on the mobile app when the reservation is about to expire and the user can select to let the reservation expire or request an extension of time if the user is still planning on utilizing the locker.

The user can access the locker by approaching the locker bank and entering the PIN code on the user's mobile device 1906. In some embodiments the user may just be notified of the locker bank and, when the user approaches the locker bank, the locker bank can detect the user's phone in proximity and then use the displays on the lockers to indicate which lockers the user can select. The user can select a particular locker by either scanning a QR code, bar code or the like on the locker door, actuating a button on the locker door, or selecting the locker using the mobile app. At this point, the locker door may open providing access to the user. For instance, if the user scans a QR code on the locker door using the mobile app, the mobile app can communication with the master server 600 (which could be located in the kiosk 1610 or the locker bank 1610, and the master server 600 can cause the lock 1718 on the locker to automatically open. In some embodiments, if the user selects a locker from the kiosk 1650, the master server 600 may automatically open the locker door so that as the user approaches the locker bank, the user can identify his or her locker by noticing the open door. Further or alternatively, the user's name or ID can be displayed on the display device of the locker door. As the user approaches the locker bank 1610, the display can begin to flash, sound an alarm or use some other mechanism to attract the user's attention.

Once the user accesses the locker, the user can then pair their device with the lock box. It should be appreciated that this process could also be conducted at the kiosk 1650 and by using the kiosk. Further, it should be appreciated that the user may actually pair with the lock box prior to opening the locker. During the pairing process the PIN information entered during the registration process 1902 is synchronized 1908 with the lock box 100 (i.e., the lock box app 360 or the kiosk 1650 communicates with the controller 300 within the lock box 100 to transmit the PIN which is then stored within memory 304 or protected memory of the lock box 100). Further, the pairing process may also include pairing with the locker as well by communicating through the controller 1620. Once the synchronization is completed, the user can then enter the PIN into the lock box 100 device, to gain access to the interior of the lock box 100, to lock the locker 1614 and/or to gain access to the interior of the locker. It should be appreciated that selection of the PIN may be done on the fly rather than during registration in some embodiments. For instance, if the user is not utilizing the lock box app 360, in some embodiments, the user can simply enter a PIN in accordance with provided instructions (such as a card or sticker attached to the lock box 100 or the locker bank 1610). If the user is utilizing the lock box app 360, the lock box app 360 can prompt the user to enter a PIN 1910 either by typing it into the mobile device or through the user interface of the lock box 100. If the user types the PIN into the mobile device, the lock box app 360 will interface with the lock box 100 and program the PIN into the lock box and also interface to the locker bank 1610 and/or locker 1614 and program the PIN into the controller 1620 for the selected or reserved locker. This can be accomplished using a wireless connection such as BLUETOOTH, cellular data or any other wireless communication technique. In some embodiments, the lock box app 360 may have a previously assigned PIN that the user has selected when registering the app and the lock box app may automatically program the PIN into the lock box 100 after or during pairing the lock box 100 and mobile device and into the locker bank 1610 after or during pairing the locker 1614 and mobile device, or by the kiosk. In yet other embodiments, the lock box app 360 may gain access to the PIN that the user utilizes to unlock his or her mobile device and automatically program the lock box 100 and locker 1614 with that PIN.

Once the PIN is utilized to gain access to the lock box 100 and/or the locker 1614 (regardless of the technique for selecting the PIN), the user can place items 1912 into the lock box 100 or locker 1614. At this point, the user can close 1914 the access panel 112 to the lock box 100 and either leave the lock box 100 within the locker 1614 or remove the lock box 100 to take to the beach or other location. Upon detecting that the access panel 112 is closed, the lock box 100 and/or the lock box app 360 can cause the processing unit 302 to activate the door lock motor 334 through the interface component and cause the door lock to transition from an unlocked state to a locked state. The user can then close door to the locker 1614. Upon detecting that the locker door is closed 1914, the controller 1620 and/or lock box app can cause the locker door lock to transition from unlocked state to a locked state. It should be appreciated that the access panel 112 and the lock box 100, as well as the locker 1614 or locker bank 1610 may include a sensor to detect when the access panel 112 or locker door respectively is in the opened or closed state. Those skilled in the art will be aware of such sensors that can be utilized for this purpose.

At this point, processing unit 302 can activate the door lock motor 334 through the interface component and cause the door lock to transition from a locked state to an unlocked state. The door lock motor 334 drives a locking mechanism that is used to prevent the access panel from being opened while engaged. Further, controller 1620 can send signals to the locker locking element to lock the locker. Those skilled in the art will be familiar with a wide variety of locking mechanisms including pins that can be vertically and/or horizontally slid into apertures or receiving element of the panel or from the panel into apertures of the container, as non-limiting examples.

When the user wishes to gain access to the interior of the lock box 100, the user can simply re-enter the PIN 1916. Once the PIN is re-entered, the processing unit 302 can activate the door lock motor 334 through the interface component and cause the door lock to transition from the locked state to the unlocked state. Again, the user may enter the PIN using the interface on the lock box 100 or the mobile device if the user did not place the mobile device into the lock box 100.

Once the access panel is unlocked and opened, the user can remove 1918 some or all of his or her belongings 114 from the lock box 100. If the user is done with the lock box 100, the user can unpair the user's mobile device and the lock box 1920. The user can unpair the mobile device and the lock box through the lock box app 360. The time that the mobile phone initially pairs with the lock box 100 and then unpairs can thus recorded by the lock box app 360 and can be provided to a back-end billing system for determining how much to charge the user in a time rental scenario and/or for tracking purposes to determine the level of utilization of lock boxes 100 for a particular demographic to help facilitate redistribution of the lock boxes 100 to maximize or increase utilization. The user can then simply leave the lock box 100 where it is, or the user can return it to the locker 1614, such as when the user goes to retrieving items from the locker 1922.

In some embodiments, the locker bank may simply be a docking station for the lock boxes. In such embodiments, rather than lockers with doors, the locker bank may simply be a bank of open cubbies for people to utilize. Further, if the battery power depletes on the locker box, it can sound a signal to request the user to return the lock box to the charging/docking station.

The general construction of the lock box may include a construction that prevents obstructions, such as sand, from preventing the access panel from opening. For instance, a beveled edge may be used to encourage any debris to fall out of the path of the door edge. It is also anticipated that some embodiments of the lock box 100 may include hermetic seals to allow the lock box 100 to be complete submerged in a liquid or prevent damage during rainstorms or thunderstorms. The material chosen for the construction of the lock box 100 may be selected to prevent or retard corrosion due to salt or humidity. For instance, the interior and/or exterior of the lock box may be painted with an amortized paint or be constructed or covered with anodized plastic. Further, the locking mechanism and hinges of the access panel 112 may be configured such that they are not externally accessible, thereby preventing or retarding the ability to be tampered with. Further, sensors can be utilized to detect when the access panel 112 is being tampered with, such as vibration sensors, and to sound an alarm if the condition exists. The lock box 100 should be constructed to be light weight and easily transported. Preferred embodiments will be less than 15 pounds, while other embodiments may be heavier. The weight could be selected to allow the lock box to be easily transported but not so light that it can be blown over by the wind. Some embodiments may be constructed so that the lock boxes 100 can be stacked on top of each other.

The electronics of the lock box 100 and locker bank 1610 should be housed within the interior of the lock box 100 or locker bank 1610 respectively, or behind an interior accessible panel to provide protection and prevent tampering. The electronics may also be constructed to be modular so that portions can be removed for repair or replacement, receive upgraded electronics/software, and features can be added by inserting additional or alternative plug and play components. In some embodiments, the features and operation of the lock box can be modified over the air or through a connection by downloading new software or configuration files. Similarly, the internal battery of the lock box should also be protected and should be accessible for removing so that the batteries can be replaced or charged externally.

The locker bank can be constructed of a wide variety of materials including polyurethane or polyurethane coated material, or similar material to protect the locker bank from the elements. The material should be selected to be rugged enough to prevent easy break in such as cutting the door open with a knife.

The locker bank may be fully modularized. This can be accomplished by utilizing a bus type system that connects to the main locker unit that houses the controller 1620, the batteries 1618 and the input from the solar panels 1616. Each modular component of the locker bank can then be connected to an adjacent modular component and thus be hooked into the bus system for power, control, etc.

In some embodiments, the locker bank 1610 and/or kiosk 1650 may include one or more cameras to monitor activity around the locker bank 1610 and or kiosk. The cameras can provide live feed through the locker bank communications/control subsystem 1620 for local or online storage accessible over the Internet or a local area network. The camera feeds can be backed up to storage and archived for a period of time or perpetually. The cameras can be hidden or in the open. In some embodiments the cameras can be controlled by one or more motion detectors and only provide feeds when motion is detected or, the cameras can run continuously. Further, in some embodiments, the cameras may run continuously but only provide the feed for storage when motion is detected or plus and minus a period of time after detecting motion or locker activity, such as a locker being opened, closed, or access attempted. The camera subsystem may also be activated by the presence of sounds, or digital signal processing can be performed on detected sounds to recognize voices. The locker bank may also include an alarm subsystem to detect any tampering with the locker bank or individual lockers. Activity such as multiple failed access attempts, signal processed sounds that may resemble banking or prying of the locker doors, excessive motion such as tilting or jarring of the locker bank, etc. Once suspicious activity is detected, an audible alarm can be sounded or a silent alarm can be triggered to notify authorities or operators.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow:

What is claimed is:
1. A system to provide securement of valuables in public locations, the system comprising:
    a locker bank of one or more lockers, the locker bank comprising:
        a communications/controller subsystem; and
        a solar based battery charging system; and
    each locker of the one or more lockers comprising:
        a display;
        a locker communications/control subsystem that is communicatively coupled to the locker bank communications/control system;
        a door;
        a lock; and
        an access handle;
    a kiosk comprising:
        a display screen;
        an input device;
        a kiosk communications/control subsystem that is communicatively coupled to the locker bank communications control system, the kiosk being configured to:
            provide a user interface for a user to register with the system;
            identify a PIN code for the user;
            enable the user to select a particular locker from the locker bank; and program the locker bank communications/control system to recognize the PIN code to gain access to the particular locker, wherein one or more of the one or more lockers includes a portable locker box within an interior of the locker, each portable locker box comprising:

a container defining at least one interior compartment and an access panel that can transition between a closed state thereby preventing access to the interior compartment and an open state thereby granting access to the interior compartment;

a controller mounted within the interior of the container and comprising a processing unit, memory and an interface component communicatively coupled to each other;

a global positioning system ("GPS") receiver mounted within the interior of the container and communicatively coupled to the controller, wherein the GPS receiver can provide a current location of the apparatus to the controller;

a display mounted on the exterior of the container and communicatively coupled to the controller;

a user interface mounted on the exterior of the container and communicatively coupled to the controller, the user interface configured to receive a PIN and control input from a user;

a lock motor, communicatively coupled to the controller and configured to actuate a locking mechanism to a first state to secure the access panel in a closed position and to a second state to allow the access panel to be opened;

a charging port for charging a mobile device; and a communication module associated with the container and communicatively coupled to the controller, the communication module including a wireless transceiver for communicating the current status of a locking mechanism and the current location to external devices.

2. The system of claim 1, wherein the communication module includes a BLUETOOTH module, wherein the portable locker box can be BLUETOOTH paired with a mobile device.

3. The system of claim 1, further comprising an insignia on an external surface of each portable locker box, wherein the insignia can be scanned by a mobile device to facilitate BLUETOOTH pairing with the mobile device.

4. The system of claim 3, further comprising an insignia on an external surface of the locker door, wherein the insignia can be scanned by a mobile device to facilitate opening the locker door and facilitate BLUETOOTH pairing of the portable locker box within the locker with the mobile device.

5. A system to provide securement of valuables in public locations, the system comprising:

a locker bank of one or more lockers, the locker bank comprising:
 a communications/controller sub system; and
 a solar based battery charging system; and each locker of the one or more lockers comprising:
 a display;
 a locker communications/control subsystem that is communicatively coupled to the locker bank communications/control system;
 a door;
 a lock; and
 an access handle;

a kiosk comprising:
 a display screen;
 an input device;
 a kiosk communications/control subsystem that is communicatively coupled to the locker bank communications control system, the kiosk being configured to:
  provide a user interface for a user to register with the system;
  identify a PIN code for the user;
  enable the user to select a particular locker from the locker bank; and
  program the locker bank communications/control system to recognize the PIN code to gain access to the particular locker, further comprising an insignia on an external surface of the locker door, wherein the insignia can be scanned by a mobile device to facilitate opening the locker door.

6. The system of claim 5, wherein the insignia is a QR code.

7. The system of claim 5, wherein the controller is operative to determine that the portable locker box has been removed from the locker.

8. The system of claim 1, wherein the locker bank communications/controller subsystem can detect when the portable locker box is returned to the locker and is unpaired from the mobile device of the user and, wherein the locker bank communications/controller subsystem can provide a status update to the kiosk communications/controller subsystem.

* * * * *